(12) United States Patent
Liedtke et al.

(10) Patent No.: US 11,824,331 B2
(45) Date of Patent: Nov. 21, 2023

(54) PLIERS

(71) Applicant: KNIPEX-Werk C. Gustav Putsch KG, Wuppertal (DE)

(72) Inventors: Tim Liedtke, Solingen (DE); Bernd Riepe, Wuppertal (DE)

(73) Assignee: KNIPEX-WERK C. GUSTAV PUTSCH KG, Wuppertal (DE)

(*) Notice: Subject to any disclaimer, the term of this patent is extended or adjusted under 35 U.S.C. 154(b) by 460 days.

(21) Appl. No.: 17/050,307

(22) PCT Filed: Apr. 25, 2019

(86) PCT No.: PCT/EP2019/060637
§ 371 (c)(1),
(2) Date: Oct. 23, 2020

(87) PCT Pub. No.: WO2019/207054
PCT Pub. Date: Oct. 31, 2019

(65) Prior Publication Data
US 2021/0167586 A1    Jun. 3, 2021

(30) Foreign Application Priority Data
Apr. 26, 2018    (DE) ..................... 10 2018 110 105.8

(51) Int. Cl.
*B25B 7/02*    (2006.01)
*H02G 1/12*    (2006.01)
(Continued)

(52) U.S. Cl.
CPC ............. *H02G 1/1236* (2013.01); *B25B 7/02* (2013.01); *B25B 7/08* (2013.01); *H02G 1/005* (2013.01)

(58) Field of Classification Search
CPC .... B25B 7/22; B25B 7/14; B25B 7/02; B25B 7/08; B23D 29/02; B23D 29/023;
(Continued)

(56) References Cited

U.S. PATENT DOCUMENTS 3,710,406 A * 1/1973 Stanford ............. H02G 1/1214
30/90.1
5,894,617 A * 4/1999 Liou ....................... B25B 7/22
7/107

(Continued)

FOREIGN PATENT DOCUMENTS

EP    2 709 804 A1    9/2016

OTHER PUBLICATIONS

International Search Report of PCT/EP2019/060598, dated Sep. 26, 2019.

*Primary Examiner* — Robert J Scruggs
(74) *Attorney, Agent, or Firm* — Collard & Roe, P.C.

(57) ABSTRACT

Plies have a first and a second plier limb which are rotatably held relative to one another on an axis of rotation an articulation region and form a jaw region on one side of the articulation region and handle sections on the other side of the articulation region. The jaw region has a cutting pattern with first and second cutting edges which, in the closed position of the pliers, are crossed with respect to a shear plane and which have a central plane running through the axis of rotation, perpendicularly to the shear plane in the closed position. The cutting edges are crossed to a greater degree in a region remote from the articulation, in the opening direction of the pliers, than in a region closer to the articulation.

11 Claims, 15 Drawing Sheets

(51) Int. Cl.
*B25B 7/08* (2006.01)
*H02G 1/00* (2006.01)

(58) Field of Classification Search
CPC ...... B23D 33/02; B23D 33/04; H01R 43/042; H01R 43/0421; H02G 1/005; H02G 1/12; H02G 1/1236; H02G 1/1239; H02G 1/1246; H02G 1/14; B21F 1/002; B21F 1/003; B26B 17/00
See application file for complete search history.

(56) References Cited

U.S. PATENT DOCUMENTS

| | | |
|---|---|---|
| 6,588,039 B1 | 7/2003 | Bates |
| 2008/0229651 A1* | 9/2008 | Broadnax ............... A01K 97/18 43/53.5 |
| 2016/0181772 A1* | 6/2016 | Liao ....................... H02G 1/005 7/107 |

* cited by examiner

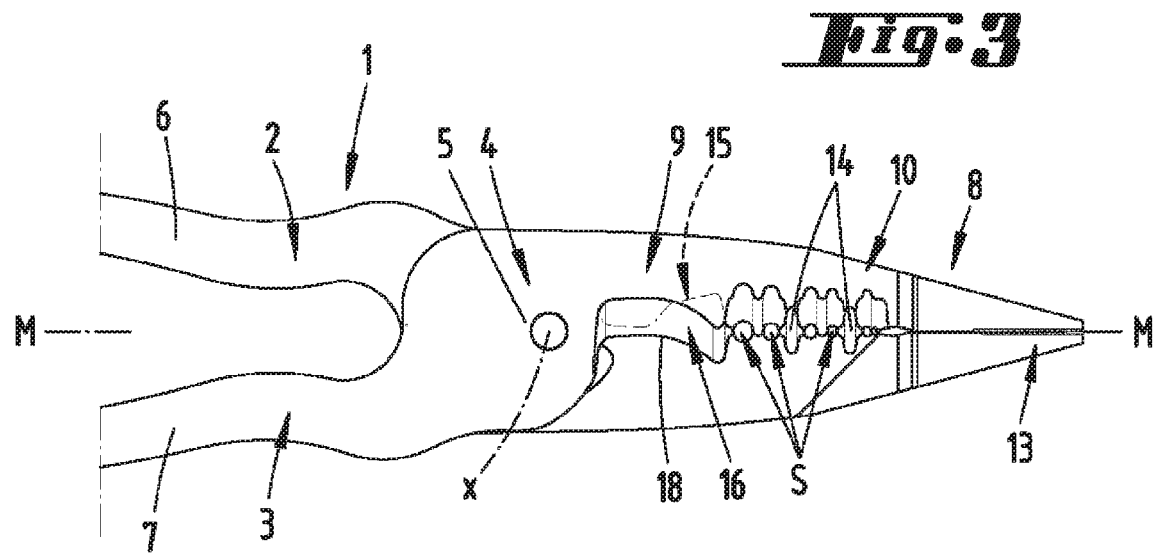
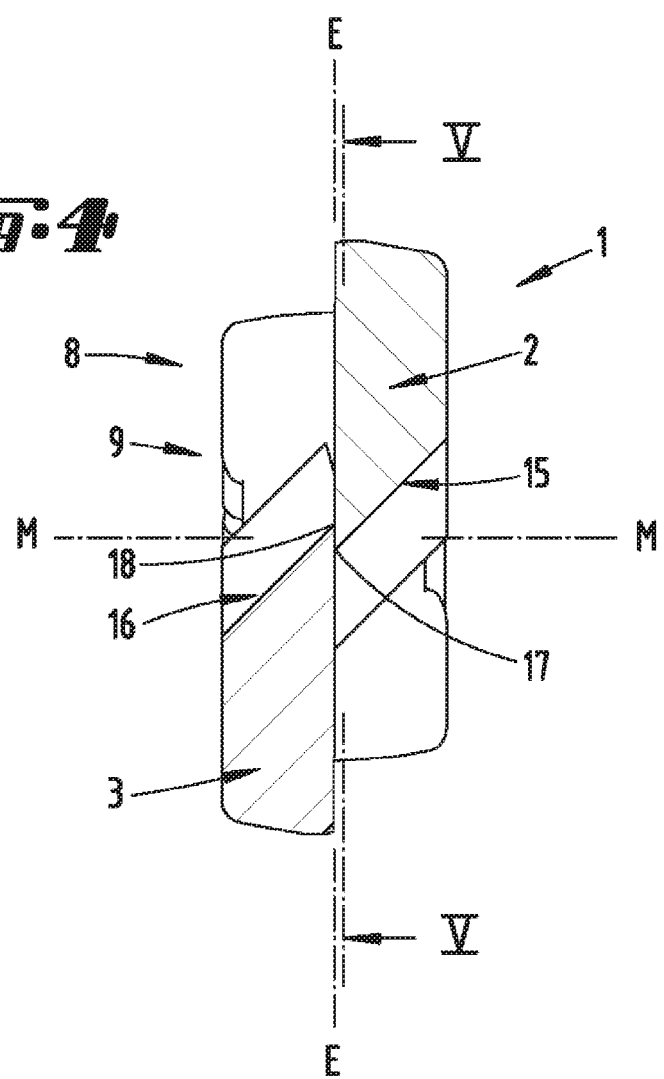

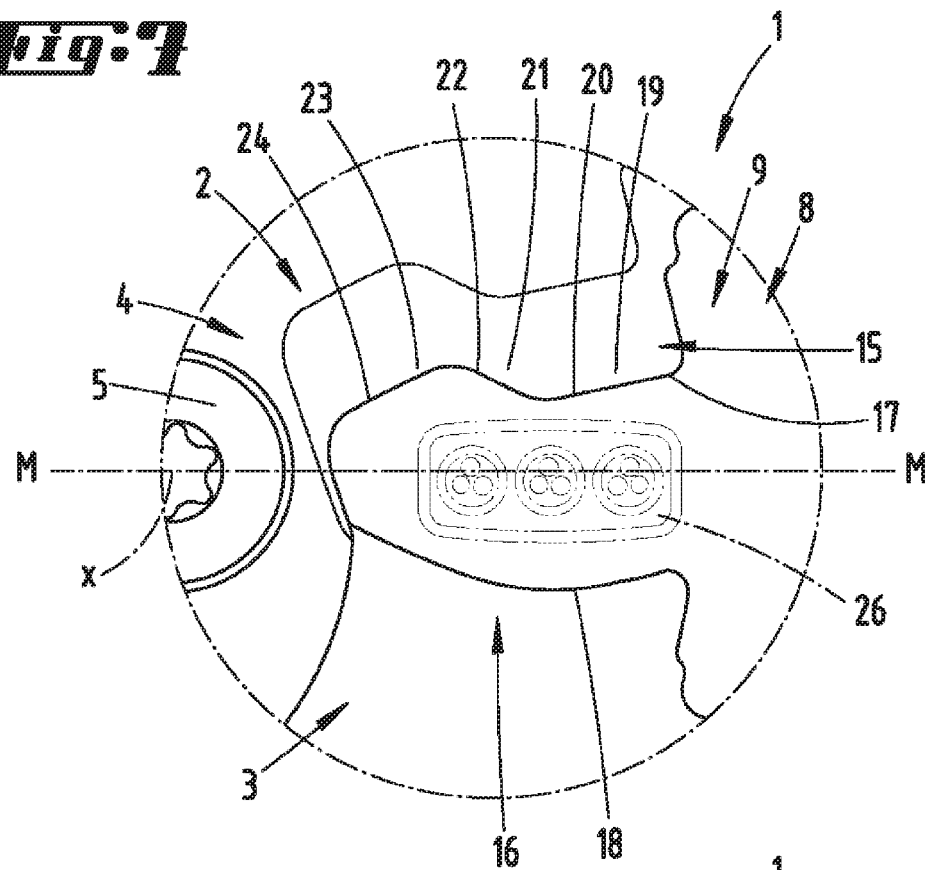
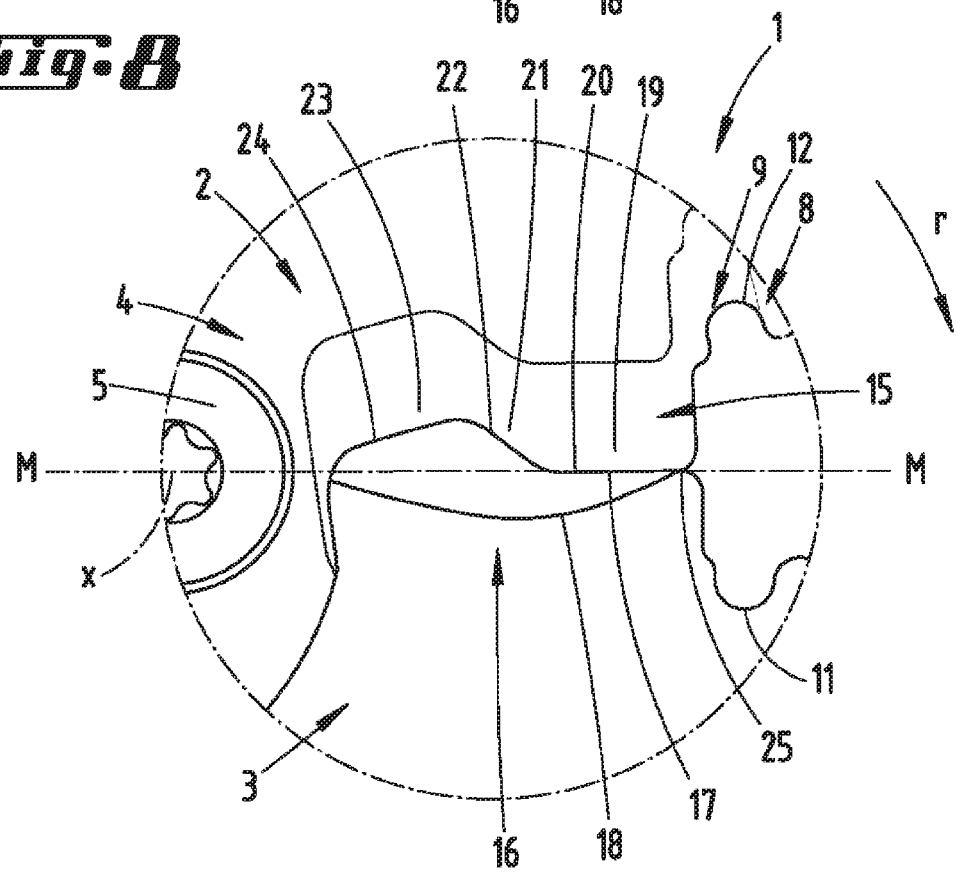

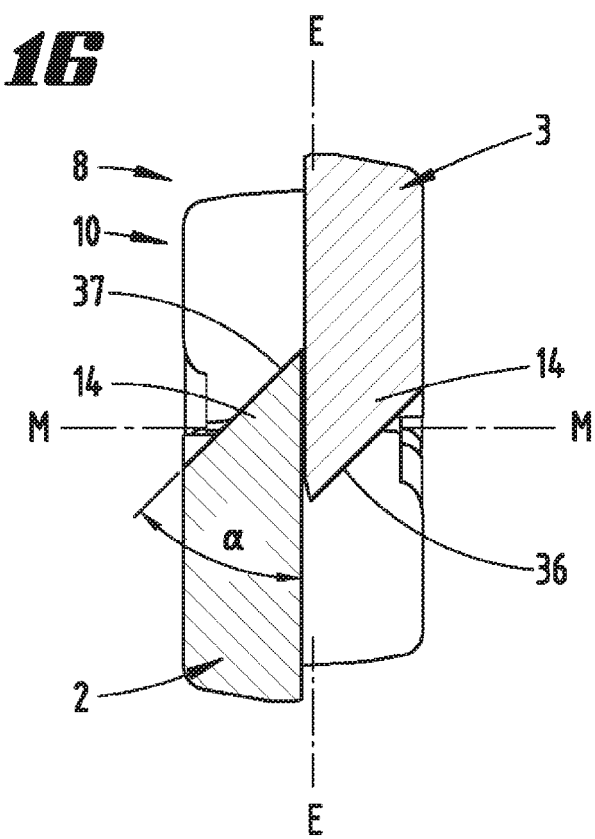
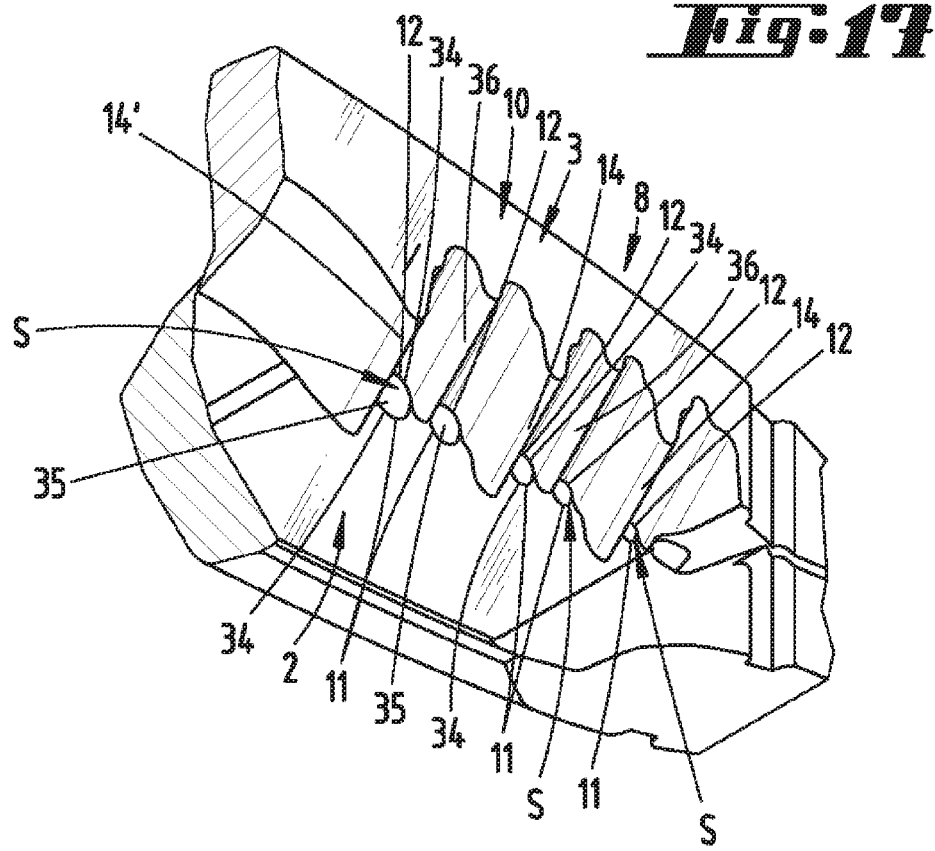

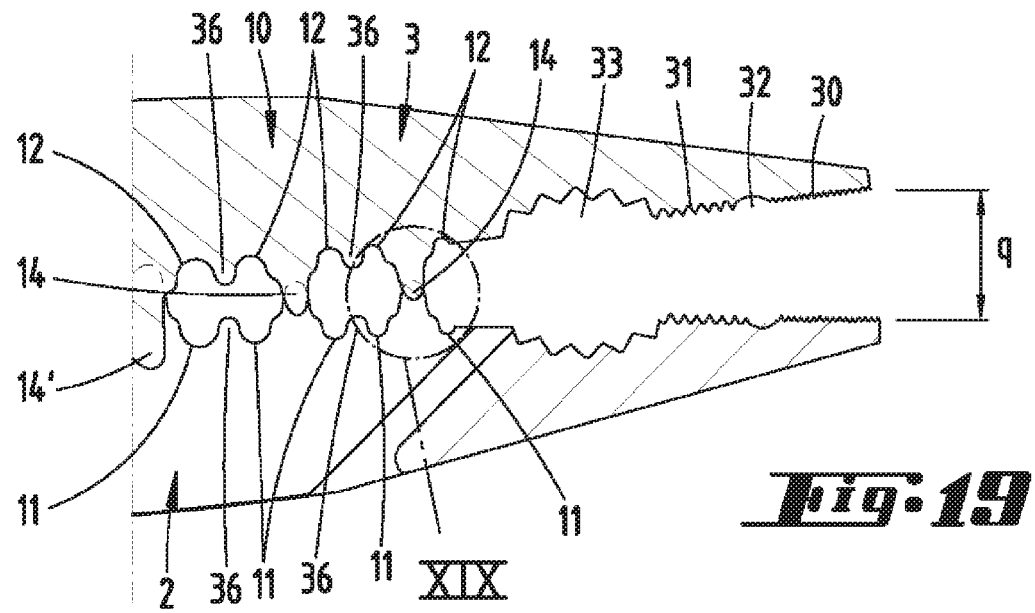
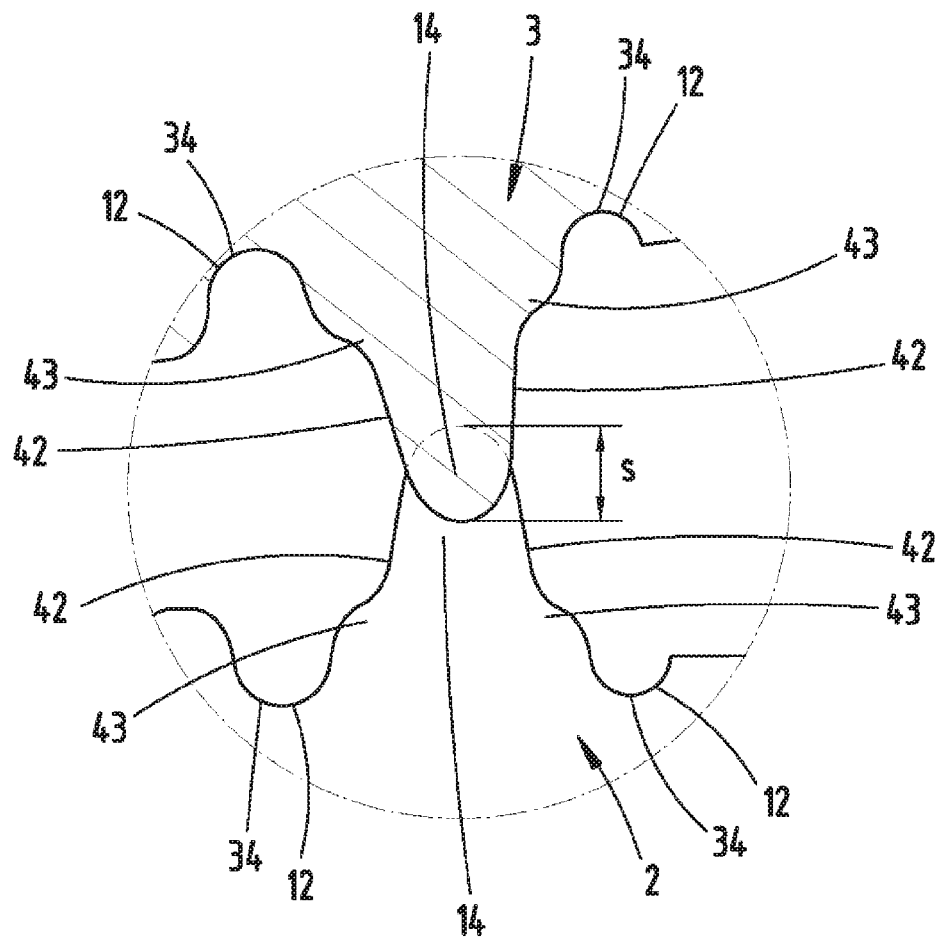

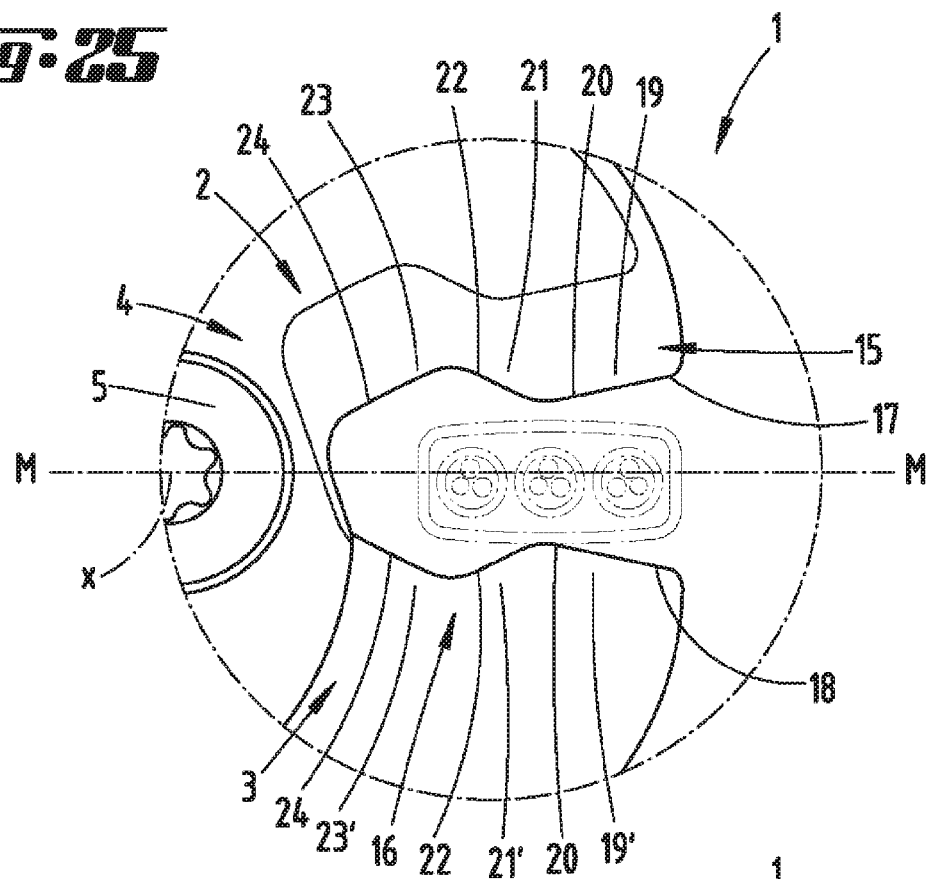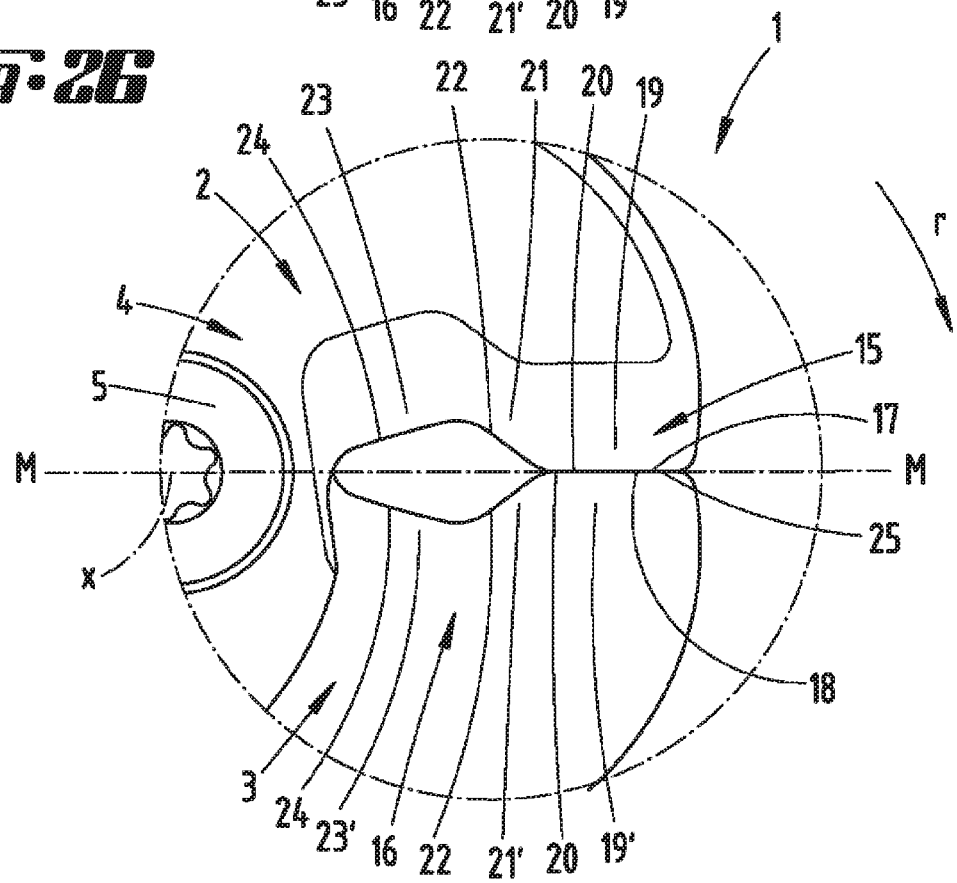

PLIERS

CROSS REFERENCE TO RELATED APPLICATIONS

This application is the National Stage of PCT/EP2019/060637 filed on Apr. 25, 2019, which claims priority under 35 U.S.C. § 119 of German Application No. 10 2018 110 105.8 filed on Apr. 26, 2018, the disclosure of which is incorporated by reference. The international application under PCT article 21(2) was not published in English.

TECHNICAL FIELD

The invention pertains to pliers with a first and a second the plier limb, which are held rotatably relative to one another in an articulation region with an axis of rotation, wherein the plier limbs form a jaw region on one side of the articulation region and handle sections on the other side of the articulation region, wherein said jaw region also has a cutting pattern with first and second blades, which in the closed position of the pliers are moved on top of one another in a scissor-like manner with respect to the shear plane, and a central plane, which in the closed state extends through the axis of rotation perpendicular to the shear plane, and wherein the blades furthermore are moved on top of one another to a greater degree in the opening direction of the pliers in a region lying remote from the articulation than in a region lying closer to the articulation.

The invention furthermore pertains to pliers with a first and a second plier limb, which are held rotatably relative to one another in an articulation region with an axis of rotation, wherein the plier limbs form a jaw region on one side of the articulation region and handle sections on the other side of the articulation region, wherein the jaw region also has a cutting pattern with first blades on the first plier limb and second blades on the second plier limb, wherein the first and second blades interact for stripping cables and have semicircular recesses, and wherein the first and second blades with their recesses furthermore complement one another so as to form a clear opening cross section in the closed position of the pliers.

PRIOR ART

In pliers known from US 2016/0181772 A1, an intermediate web, which extends over less than a maximum opening dimension of the opening, is formed on one side between adjacently arranged first and second blades and a separating web, which extends over more than a maximum opening dimension, is formed on the other side. Only the separating webs are moved on top of one another in the closed state.

In U.S. Pat. No. 6,588,039 B1, the blades are on both sides surrounded by webs, which respectively extend over more than a maximum opening dimension of the opening cross section.

EP 2 709 804 B1 discloses pliers with shear blades, wherein the shear blades are in the closed state of the pliers moved on top of one another to a greater degree in a region lying remote from the articulation than in a region lying more remote from the articulation. The flat jaw-like gripping surfaces of these pliers are structured over part of their length. Completely structured gripping surfaces are also known in this respect.

SUMMARY OF THE INVENTION

Based on the prior art according to US 2016/0181772 A1, the invention aims to disclose advantageous first and second blades for wire stripping in parallel.

This objective is attained, according to the invention in which it is proposed that two adjacently arranged first and second blades leave an intermediate web between one another, wherein said intermediate web extends over less than a maximum opening dimension of the opening cross section in the closing direction of the pliers viewed from a lowest point of the associated recess in the closing direction of the pliers, but such that the intermediate webs of both plier limbs are in the closed position of the pliers moved on top of one another in a region, in that a separating web, which extends over more than a maximum opening dimension of the opening cross section in the closing direction of the pliers viewed from a lowest point of the associated recess in the closing direction of the pliers, protrudes over the respective recesses on the other side of the intermediate web, and in that the blades and the associated plier limbs are made of the same material.

The blades preferably are hard metal blades in accordance with the material selection of the plier limbs. These hard metal blades preferably are not only made of the same material as the respective plier limbs, but also be realized integrally therewith.

With respect to an outline, in which the axis of rotation of the plier limbs is illustrated in the form of a point, each blade of each plier limb preferably has a semicircular recess. This recess may with respect to the outline also strictly follow a circular line and furthermore approximately correspond to a semicircle or more. In addition, the semicircular recess may be formed by arranging straight blade sections in a row in the circumferential direction. For example, an essentially V-shaped recess may thereby be formed in each blade.

In the closed state of the pliers, the interacting semicircular recesses of the first and second blades form an altogether clear opening cross section. This opening cross section essentially corresponds to the conductor diameter of the cable to be stripped of its insulating sheath. The outside diameter of the insulating sheath accordingly is greater than the maximum extent of the opening cross section viewed transverse to the extent of the axis of rotation.

The intermediate webs are formed between two respective first and second blades, which are arranged adjacent to one another in the direction of the longitudinal extent of the plier limbs, and also between correspondingly formed recesses of these blades, wherein said intermediate webs provide a boundary between the opening cross section of one blade pair and the opening cross section of the adjacent blade pair, particularly in the closed position of the pliers. With respect to the closing direction of the plier limbs, such an intermediate web has a length that allows an overlap of the facing free ends of the intermediate webs of both plier limbs in the closed position of the pliers. The degree of overlap of both intermediate webs viewed in the closing direction may—with respect to a projection into a cutting plane extending transverse to the axis of rotation—be smaller than or as large as approximately identical to the maximum extent of the opening cross section, particularly the opening cross section of a directly adjacent blade pair, in the closed position of the pliers.

The two respective first and second blades, which are arranged adjacent to one another and between which the above-described intermediate web is formed, are in turn respectively flanked by the separating web on the other side of the intermediate web. This separating web not only forms a boundary of the opening cross section in the closed position of the pliers, but preferably also a contact surface for the cable to be stripped and, if applicable, a guide for the cable in the course of the stripping process. To this end, a length of the separating web viewed in the closing direction preferably can be many times greater than the length of the intermediate web viewed in the same direction. For example, this extent may be chosen greater than the maximum extent of the opening cross section in the closed position of the pliers. The length of the separating web may in this case correspond to approximately 2-times to 5-times, e.g. approximately 3-times to 4-times, the length of the intermediate web.

In the course of the closing motion of the pliers, this preferred embodiment causes the separating webs of both plier limbs to forwardly move on top of one another in order to thereby provide a reliable guide for the cable to be stripped in the direction of the directly associated first and second blades. The intermediate webs preferably reach their superimposed position in the course of this closing motion of the pliers before the cable insulation is completely severed such that the opening cross section of the corresponding blade pair can already be circumferentially closed before the closed position of the pliers is reached and accordingly before the cable sheath is completely severed.

With respect to pliers having first and second shear blades that are moved on top of one another, the invention furthermore proposes that the first shear blade has a cutting edge with different blade regions, wherein a first blade region formed in the region of the maximum degree of overlap has referred to the overall length of the cutting edge a cutting edge section, which is sloped in the direction of the articulation with respect to the central plane and with respect to the overall length of the cutting edge has a first degree of slope, wherein a second blade region has a second degree of slope that is greater than the first degree of slope, wherein a third blade region has a third degree of slope that is smaller than the first and the second degree of slope, and wherein the length of each blade region corresponds to one-fifth or more of the overall length of the blade.

The thusly designed cutting edge geometry leads to an improved cutting result. The user friendliness is increased because the proposed geometry reduces the expenditure of force required for cutting an object to be cut, for example a cable, in comparison with known cutting geometries. Furthermore, the proposed geometry also makes it possible to advantageously cut objects to be cut with different cross-sectional designs and thicknesses.

The cutting edge may essentially be divided into at least three cutting sections that in a potential embodiment transform into one another from a maximum degree of overlap to a minimum degree of overlap with the second blade—viewed in the direction of the articulation region. The respective degree of slope, particularly of the cutting edge section of the first blade region that preferably lies remote from the articulation and preferably also of the cutting edge section of the second and optionally central blade region, may particularly in the closed position of the pliers result from the difference between two distance values of the respective cutting edge section from the central plane, which are spaced apart from one another along the center line by a predefined distance. In the case of the greater degree of slope, the corresponding cutting edge section is sloped steeper over a distance plotted on the central plane than in a comparable cutting edge section with a smaller degree of slope viewed over the same distance on the central plane.

For example, the degree of slope of the second and preferably central blade region may approximately correspond to three-times to ten-times, e.g. about four-times to six-times, the degree of slope in the first blade region lying remote from the articulation. The degree of slope in the third blade region, which preferably lies near the articulation, preferably is smaller than the degree of slope in the first blade region lying remote from the articulation and may furthermore correspond, for example, to 0.1-times to 0.5-times the degree of slope in the first blade region. The degree of slope may also be equal to zero such that the corresponding cutting edge section may extend at a constant distance from the central plane.

According to a preferred embodiment, each cutting edge section, particularly of the first and the second blade region, furthermore may be designed such that it slopes in the direction of the articulation region (at least with respect to the closed position of the pliers) whereas the third blade region lying near the articulation may have a degree of slope that is approximately equal to zero or even have a negative value in comparison with the degrees of slope of the first and the second blade regions. Accordingly, the third blade region may have a cutting edge section that is sloped toward the second, central blade region facing away from the articulation region.

The three blade regions, which preferably are arranged in direct succession, may with respect to their respective length be uniformly distributed over the overall length of the thusly formed shear blade such that each blade region may correspond to approximately one-third of the overall blade length. With respect to the overall length of the blade projected into the central plane in the closed position of the pliers, the second, central blade region particularly may correspond to approximately one-fifth to one-fourth of the overall length whereas the first and third blade region arranged adjacent thereto on both sides may approximately have the same length.

The second transition blade section, which—referred to its longitudinal extent—has in a projection on the shear plane the greatest dissimilarity from the second shear blade with respect to the degree of overlap, is arranged adjacent to the first blade section with the maximum degree of overlap in the closed position of the pliers, which lies remote from the articulation.

In connection with such a blade design, the opening contour between the first and second cutting edges of the shear blades, which remains in the position of an initial contact between the first blade and the second blade in a contact point during closing of the plier limbs, may according to a potential enhancement be realized symmetrical with respect to a central plane extending transverse to the cutting plane and through the axis of rotation and the contact point. Consequently, both shear blades may altogether be realized essentially identical, particularly with respect to the extents of their cutting edges.

Alternatively or additionally to the proposed solution, it would also be possible that the opening contour between the first and second cutting edges of the shear blades, which remains in the position of an initial contact between the first shear blade and the second shear blade in a contact point during closing of the plier limbs, is realized asymmetrical with respect to a central plane extending transverse to the cutting plane and through the axis of rotation and the contact point.

The respectively resulting contact or contact point preferably refers solely to a projection of the cutting edges into a common cutting plane.

For example, the cutting edge of the first or second shear blade may be uniformly rounded and extend in a concavely curved manner viewed from the central plane, e.g. in accordance with the prior art, whereas the cutting edge of the other shear blade has a cutting edge contour that deviates from this preferably uniformly rounded cutting edge.

An advantageous cutting result can be achieved due to the asymmetric design, particularly in the instant of an initial contact. Furthermore, an advantageous design of the pliers in terms of handling can thereby also be achieved such that a cutting process preferably can be carried out with a reduced expenditure of force in comparison with solutions known from the prior art.

An opening, the outer opening edges of which extend asymmetrical to the central plane, is defined between the blades by the cutting edges during an initial contact of the shear blades remote from the articulation in the course of moving together the plier limbs, wherein an opening area, more than 80 percent of which preferably are essentially located on one side of the central plane, may initially be defined remote from the articulation over at least one-fifth of the overall length of the cutting edge projected on the central plane. This may result in a design, in which the opening area in the region lying remote from the articulation is in the instant of such an initial contact smaller than in the region near the articulation and/or at least nearly formed solely on one side of the central plane. If applicable, the object to be cut lying in the opening, e.g. a flat cable, is partially severed in the region lying remote from the articulation and then successively severed as a result of an additional closing motion of the plier limbs or the cutting edges in the direction of the articulation region. In case of doubt, the object to be cut is in the course of the cutting process at least by tendency pushed in the direction of the articulation region as a result of the proposed blade geometry. This leads to an advantageous cutting process and cutting result.

As the opening is progressively closed, the opening area may aside from potential rounding geometries assume a triangular shape. Such a triangular opening shape may be adjusted, for example, after the first blade region lying remote from the articulation has been completely moved over the opposite shear blade, wherein the triangular opening contour may in this instant essentially be composed of the cutting edge section of the blade region of the first shear blade near the articulation, the adjacent cutting edge section of the second, central blade region and the bottom section of the cutting edge of the second blade, which in this position practically spans these two blade regions.

The opening contour may also be defined by a first a convex extent of the first cutting edge, particularly in the first and second blade regions of the first shear blade, and an opposite concave extent of the second cutting edge.

Furthermore, the opening contour may be defined by an additional concave extent of the first cutting edge, e.g. in the third blade section near the articulation region, opposite of the concave extent of the second cutting edge.

The convex extent of the cutting edge, which is essentially formed by the first blade region, is connected to the second blade region, which essentially extends in a concave manner, by the second, central blade region. In a preferred embodiment, a cutting edge, which continuously extends in a concave manner over the entire length, lies opposite of all cutting regions of the first cutting edge, wherein this concave extent may be chosen approximately constant over the entire length of the cutting edge.

The concave extent of the first cutting edge may also have a smaller degree of curvature than the concave extent of the second cutting edge. The degree of curvature of the concave extent of the first cutting edge, particularly in the third blade region near the articulation, may even be so small that a linear extent of the corresponding cutting edge may be formed solely in this third blade region near the articulation with respect to a projection into the cutting plane. A concave extent of the third blade region may be altogether formed by the regions located adjacent thereto on both sides in the extending direction (the articulation region on the one hand and the second blade region on the other hand).

Other characteristics of the invention are frequently described below, as well as in the description of the figures, in their preferred association with the object of the invention.

According to another preferred embodiment, an outer edge of the separating web, which faces the first or second blade, may be realized in a step-like manner in such a way that a step-like widening of the opening cross section (in the non-closed state of the pliers) or a taper of the separating web transverse to the closing direction of the pliers is formed starting at approximately half the opening dimension of the opening cross section—referred to the closed state of the pliers.

As a result of this step-like design, an advantageous guidance of the cable to be stripped, particularly in terms of handling, is initially and essentially achieved in the direction of the associated blade recess. In the course of the stripping process, the cable to be stripped preferably is supported on the step-like widening with its insulating sheath on both sides of the associated recess and on the associated intermediate web at the other end of the recess. In this way, the cable to be stripped can simultaneously also be centered with respect to the associated recess.

The step-like taper may be approximately formed in the region of half the length of the separating web or, if applicable, in the region of a first third of this extent starting from a lowest point of the associated recess in the closing direction of the pliers. In another preferred embodiment, adjacent blades of a plier limb form opening cross sections of different sizes in the closed state of the pliers. Accordingly, these blades preferably are adapted to different conductor or cable diameters. The opening cross sections may be adapted to conventional conductor cross sections such as 0.2, 0.3, 0.8, 1.5, 2.5 or 4 $mm^2$.

It would also be possible to form multiple separating webs on a plier limb, wherein two separating webs of the same plier limbs may have different lengths. Furthermore, multiple groups of first and second blades, which are spaced apart from one another by separating webs, may be provided—viewed over the length of the plier limb.

According to a potential embodiment, separating webs, adjacent to which blade recesses are formed on both sides in the longitudinal direction of the plier limb, may have identical lengths viewed in the closing direction of the pliers. In contrast, other separating webs, e.g. webs that altogether separate the stripping region from a section lying adjacent thereto in the longitudinal direction of the limb, may have greater or smaller lengths. For example, larger separating webs may have a length that approximately corresponds to 1.5-times to 3-times, e.g. 2-times, the length of the other separating webs.

The separating webs furthermore have free end faces that point in the closing direction of the pliers, wherein the extent of said end faces includes an acute angle with a cutting plane. This acute angle preferably amounts to approximately 30 to 60 degrees, e.g. approximately 45 degrees.

In a preferred embodiment, intermediate webs and/or separating webs are formed on both plier limbs and preferably realized identically with respect to their lengths and width dimensions transverse to the length. It is also preferred to practically form a symmetric arrangement of separating webs and intermediate webs on both plier limbs. Furthermore, the plier limbs may be designed identically at least with respect to the stripping region with its blades, separating webs and intermediate webs.

Pliers according to another embodiment of the invention may also have two adjacently arranged first and second blades that leave an intermediate web between one another, wherein said intermediate web extends over less than a maximum extent of the opening cross section in the closing direction of the pliers viewed from a lowest point of the associated recess in the closing direction of the pliers, but such that the intermediate webs of both plier limbs are in the closed position of the pliers moved on top of one another in a region, wherein a separating web, which extends over more than a maximum opening dimension of the opening cross section in the closing direction of the pliers viewed from a lowest point of the associated recess in the closing direction of the pliers, protrudes over the respective recesses on the other side of the intermediate web, and wherein the blades and the associated plier limbs are made of the same material.

The characteristics of the above-described independent claims are respectively important individually, as well as in any combination with one another, wherein characteristics of one independent claim furthermore can be combined with the characteristics of another independent claim or with characteristics of multiple independent claims, as well as with only individual characteristics of one or more of the other independent claims. For example, pliers according to the invention may also have two adjacently arranged first and second blades that leave an intermediate web between one another, wherein said intermediate web extends over less than a maximum extent of the opening cross section in the closing direction of the pliers viewed from a lowest point of the associated recess in the closing direction of the pliers, but such that the intermediate webs of both plier limbs are in the closed position of the pliers moved on top of one another in a region, wherein a separating web, which extends over more than a maximum opening dimension of the opening cross section in the closing direction of the pliers viewed from a lowest point of the associated recess in the closing direction of the pliers, protrudes over the respective recesses on the other side of the intermediate web, and wherein the blades and the associated plier limbs are made of the same material.

With respect to the disclosure, the ranges or value ranges or multiple ranges indicated above and below also include all intermediate values, particularly in $1/10$ increments of the respective dimension, but optionally also dimensionless. For example, the indication 2-times to 10-times also includes the disclosure of 2.1-times to 10-times, 2-times to 9.9-times, 2.1-times to 9.9-times, etc. The respective disclosure may on the one hand serve for defining a lower and/or upper limit of a cited range, but alternatively or additionally also for disclosing one or more singular values from a respectively indicated range.

BRIEF DESCRIPTION OF THE DRAWINGS

The invention is described in greater detail below with reference to the attached drawings that, however, merely show exemplary embodiments. A component, which is described with reference to one of the exemplary embodiments and not (directly) replaced with a different component in another exemplary embodiment, is therefore also described as a potentially existing component in this other exemplary embodiment. In the respective drawings:

FIG. 3 shows a rear view of FIG. 2;

FIG. 4 shows an enlarged section along the line IV-IV in FIG. 2;

FIG. 7 shows an enlarged detail of the region VII in FIG. 2, however, concerning the open position of the pliers, in which an object to be cut lies in a blade region;

FIG. 8 shows a follow-up representation to FIG. 7 in the course of a cutting process as a result of a rotational displacement of the plier limbs in the direction of a closed position;

FIG. 16 shows a section along the line XVI-XVI in FIG. 13 through the region of a separating web;

FIG. 17 shows a perspective representation of the stripping region illustrated in FIG. 13;

FIG. 18 shows a section along the line XVIII-XVIII in FIG. 14 with slightly opened plier jaw;

FIG. 19 shows an enlarged detail of the region XIX-XIX in FIG. 18;

FIG. 25 shows a representation that corresponds to FIG. 7 and concerns another embodiment;

FIG. 26 shows another embodiment in the form of a representation according to FIG. 8.

DESCRIPTION OF THE EMBODIMENTS

Figure 1:
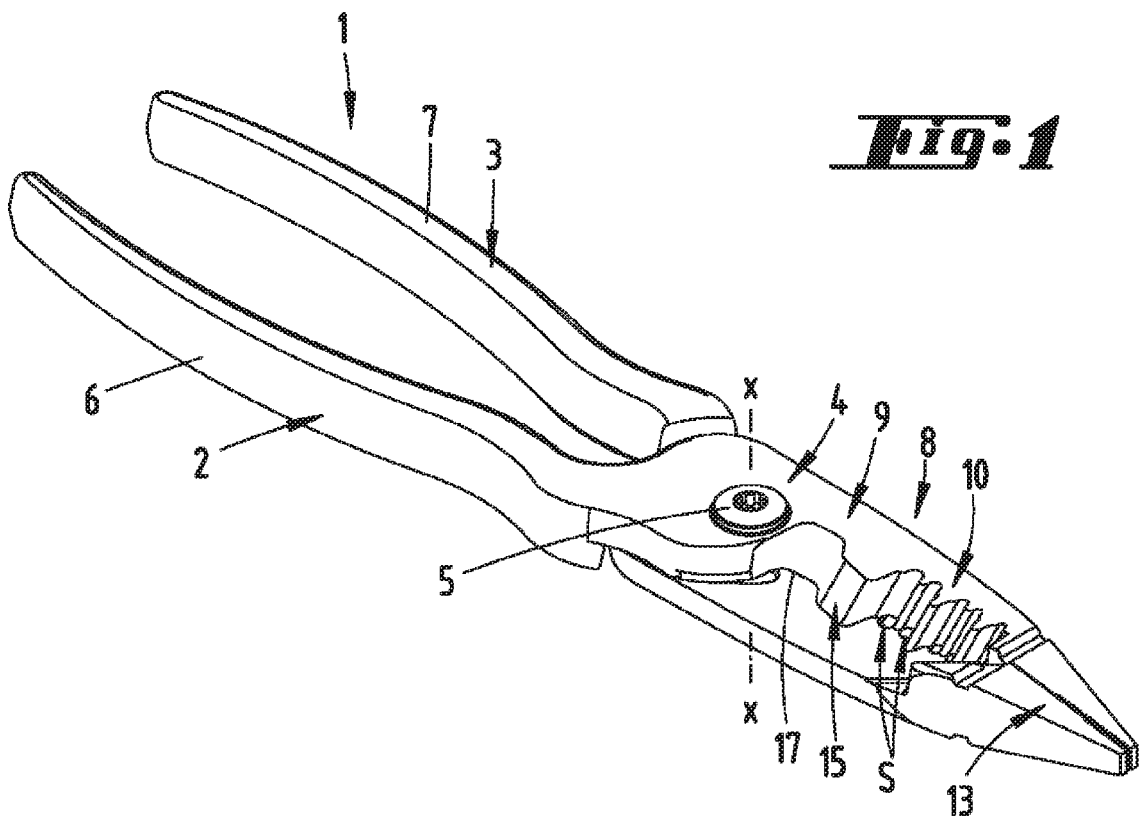
FIG. 1 shows a perspective representation of pliers concerning the closed position.

Pliers 1 with a first plier limb 2 and a second plier limb 3 are initially described with reference to FIG. 1. The plier limbs 2 and 3 are held rotatably relative to one another about a geometric axis of rotation x in a crossing manner in an articulation region 4, namely by means of an articulation pin 5.

The plier limbs 2 and 3 form handle sections 6 and 7 on one side of the articulation region 4 and a jaw region 8 on the other side of the articulation region 4.

The jaw region 8 specifically has different jaw sections that are arranged behind one another, i.e. successively referred to a central plane M that is oriented perpendicular to a rotation and shear plane E and includes the axis of rotation x, wherein said jaw sections initially comprise a cutting region 9 near the articulation, i.e. preferably directly adjacent to the articulation region 4, an adjacent stripping region 10 with different successively arranged cutting patterns 11 and ultimately a flat jaw region 13 on the free end of the plier limbs 2 and 3.

Figure 2:
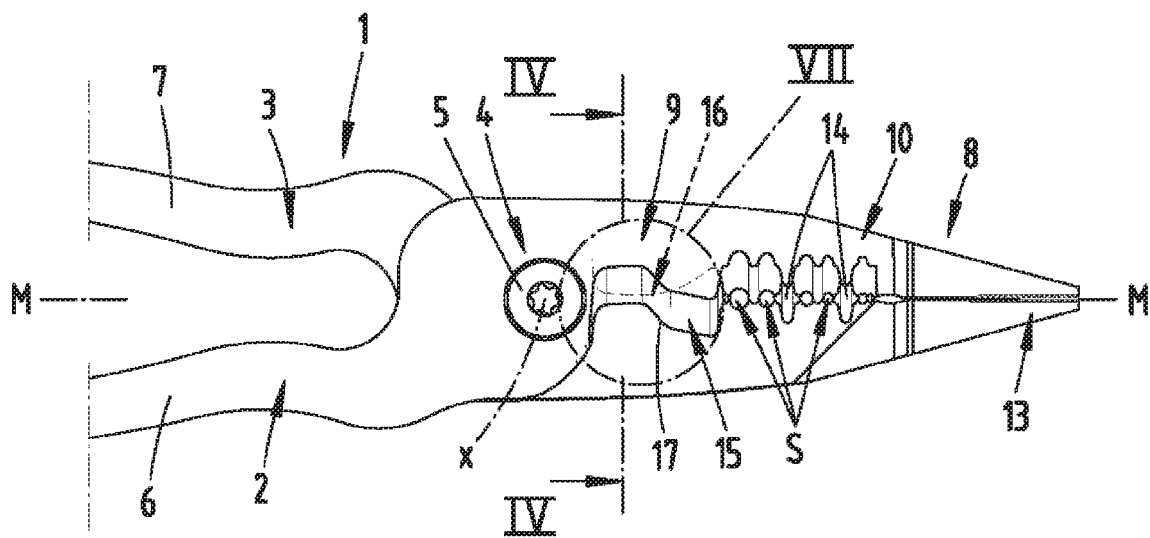
FIG. 2 shows a top view of a detail of the pliers concerning the position according to FIG. 1.
Figure 5:
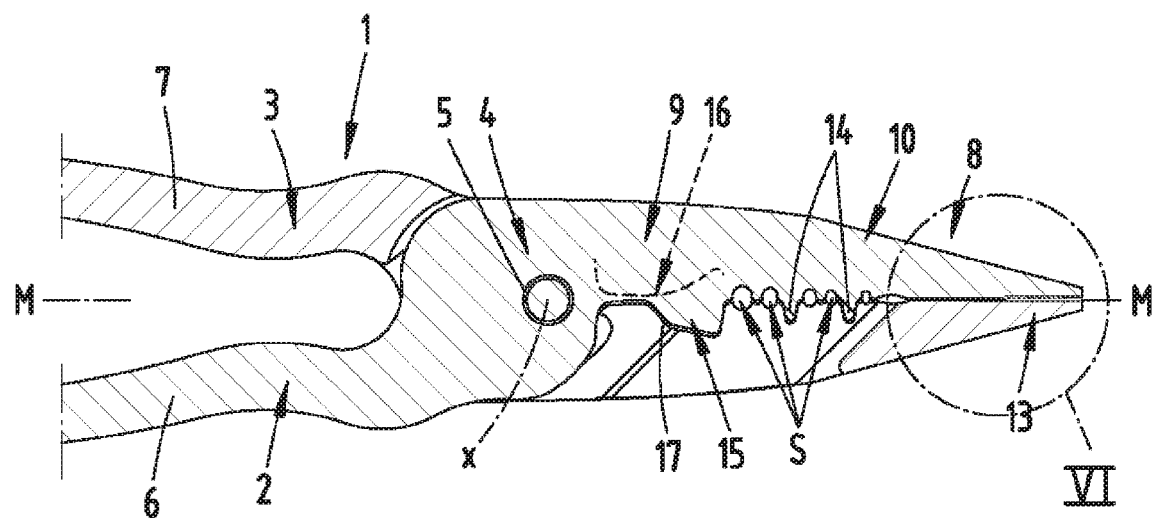
FIG. 5 shows a section along the line V-V in FIG. 4.

The cutting patterns S in the stripping region 10 are respectively formed by two interacting first and second blades 11, 12, which accordingly are formed opposite of one another on the first plier limb 2 and the second plier limb 3, wherein five successively arranged cutting patterns S, which in the closed position of the pliers 1 according to the illustrations in FIGS. 1 and 2 have different diameters, are provided in the exemplary embodiment shown.

In the exemplary embodiment shown, separating webs 14 are provided on the first plier limb 2, as well as on the second plier limb 3, in order to optically and haptically divide the cutting patterns S and to quickly and intuitively locate the relevant cutting pattern S for the wire to be stripped, namely also under inferior light conditions, wherein said separating webs divide the cutting patterns S, for example, into three groups that respectively comprise one or two cutting patterns S. In the closed position of the pliers, the separating webs 14 have moved over the central plane M and abut on the facing planar rear surface of the other plier limb.

This makes it easier for the user to remember the position of the individual cutting patterns S for the individual cross sections. Furthermore, the separating webs 14 also act as a kind of stop, which enables the user to locate the correct cutting pattern S in a purely haptic manner without having to look at the pliers. This is particularly advantageous in poorly illuminated environments as they are frequently encountered on construction sites.

Figure 10:
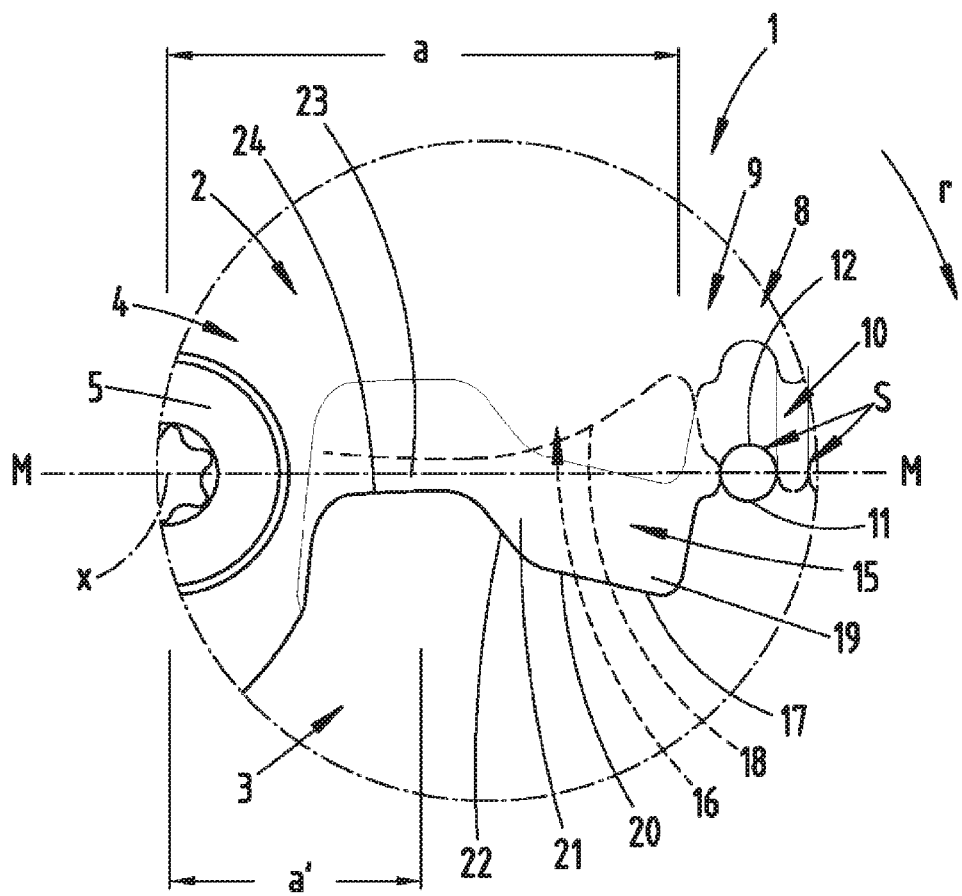
FIG. 10 shows a follow-up representation to FIG. 8 concerning the closed position.
Figure 11:
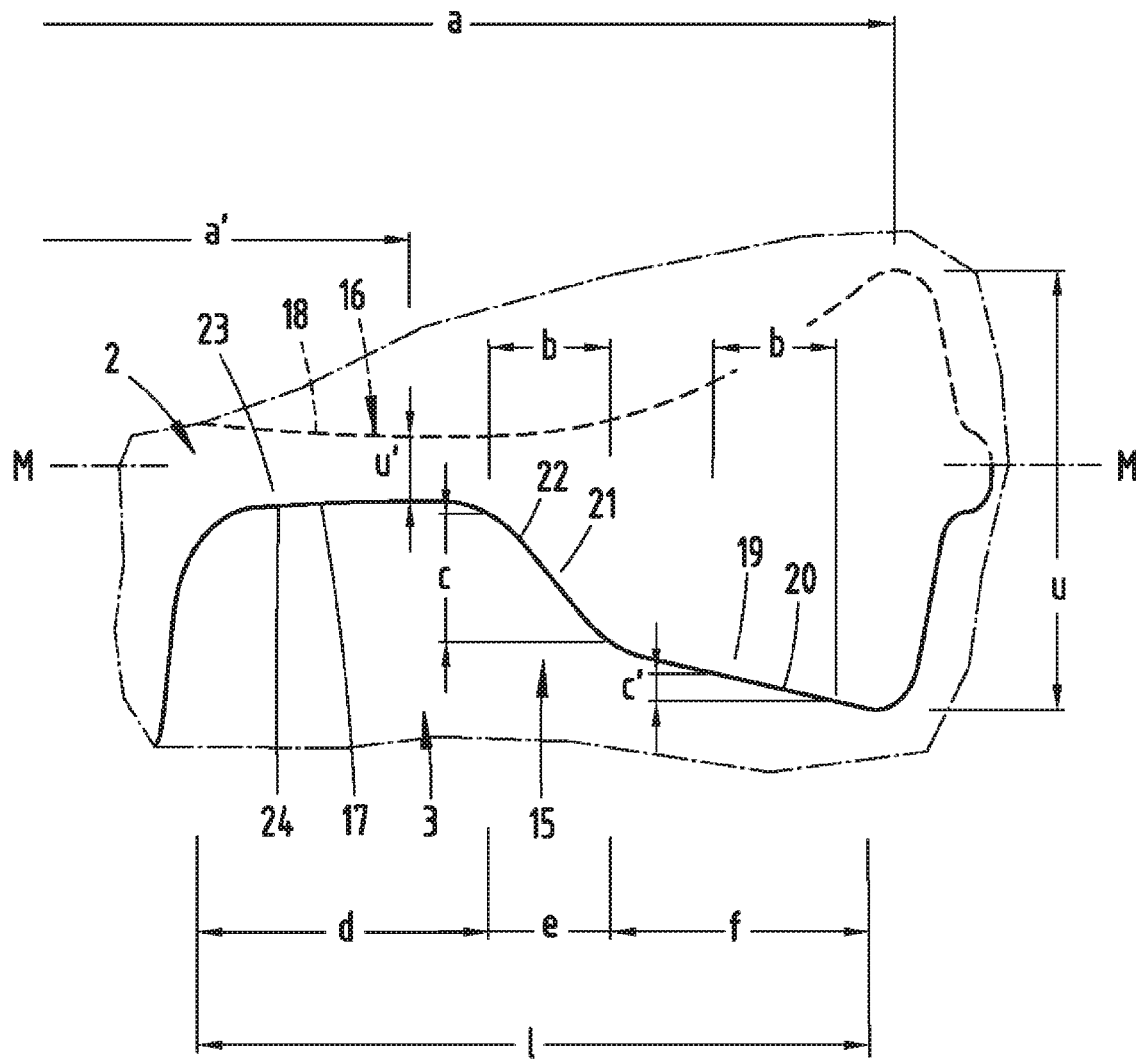
FIG. 11 shows a schematic representation that essentially corresponds to FIG. 9 and concerns the blade position according to FIG. 10.

Furthermore, both plier limbs 2 and 3 form first and second shear blades 15, 16 adjacent to the cutting pattern S, wherein said shear blades are moved on top of one another in a scissor-like manner when the pliers 1 are closed (see dashed illustration of the shear blade 16 in FIGS. 10 and 11).

In the first embodiment illustrated in FIGS. 1 to 12, the second cutting edge 18 of the second shear blade 16 is with respect to an outline, e.g. according to FIG. 7, and also with respect to a projection into the shear plane E shaped in a concave manner throughout starting from the central plane M and preferably extends along an at least continuously curved line.

In the first embodiment, the first cutting edge 17 of the first shear blade 15 is with respect to the central plane M shaped asymmetrical to the opposite second cutting edge 17, wherein a length l of the two cutting edges 17 and 18 may be identical in a vertical projection of the respective cutting edge into the central plane M.

The cutting edge 17 of the first shear blade 15 essentially has—viewed from the central plane M—a concave extent near the articulation and an adjacent convex extent remote from the articulation.

The blade geometry is furthermore realized in such a way that both shear blades 15 and 16 have in a closed position of the pliers according to FIGS. 10 and 11 a greater degree of overlap u in a region of the cutting pattern S, which lies remote from the articulation referred to a distance a from the axis of rotation x, than in a region near the articulation, which is spaced apart from the axis of rotation x by a distance a' (compare to FIG. 11). The degree of overlap u' in the region lying near the articulation approximately corresponds to 0.1-times to 0.3-times, e.g. approximately 0.15-times to 0.2-times, the degree of overlap u in the region lying remote from the articulation.

The first shear blade 15 is essentially composed of three blade regions, which are arranged behind one another and in which the respective cutting edge sections have different extents. In this case, a first blade region 19 lying remote from the articulation is formed in the region of maximum overlap. This first blade region 19 has referred to the overall length l of the corresponding cutting edge 17 a cutting edge section 20, which is sloped in the direction of the articulation region 4 with respect to the central plane M.

A second, central blade region 21 with a cutting edge section is arranged adjacent to this first blade region and ultimately transforms into a third blade region 23 with a cutting edge section 24 near the articulation.

The first blade region 19 particularly forms the above-described blade region with a convex extent together with the second blade region 21 whereas the third blade region 21 essentially forms the concave portion of the extent of the cutting edge 17 in overlap with the central or second blade region 21.

With respect to a vertical projection into the central plane M, the resulting length e of the second, central blade region 2 may approximately correspond to one-fifth of the overall length l of the cutting edge 17. The corresponding lengths d and f of the third and the first blade region 23, 19 may be chosen approximately identical.

With respect to a closed position of the pliers according to FIGS. 10 and 11, the cutting edge section 22 of the cutting edge 17 in the second blade region 21 has a degree of slope c over a length b, which is vertically projected into the central plane M, in the second, central blade region 21 when the shear blades 15 and 16 overlap correspondingly, wherein said degree of slope may at least correspond to three-times to ten-times the degree of slope c' of the cutting edge section 20 in the first blade region 19 viewed over the same length b.

This results in a step-like transition between the first blade region 19 and the third blade region 23, wherein the transition is formed by an oblique extent of the central cutting edge section 22. With respect to the projected length b, this central transition blade section also has the greatest dissimilarity from the second shear blade 16 with respect to the degree of overlap.

In the exemplary embodiment shown, the cutting edge section of the third blade region 23 extends approximately parallel to the central plane M and, if applicable, has a negative degree of slope in comparison with the other regions of the shear blade 15. In the closed position of the pliers, the cutting edge section 24 is spaced apart from the central plane M by a distance, which approximately corresponds to 0.8-times to 1.5-times the distance of the opposite region of the cutting edge 18 of the second shear blade 16 from the central plane M.

Figure 9:
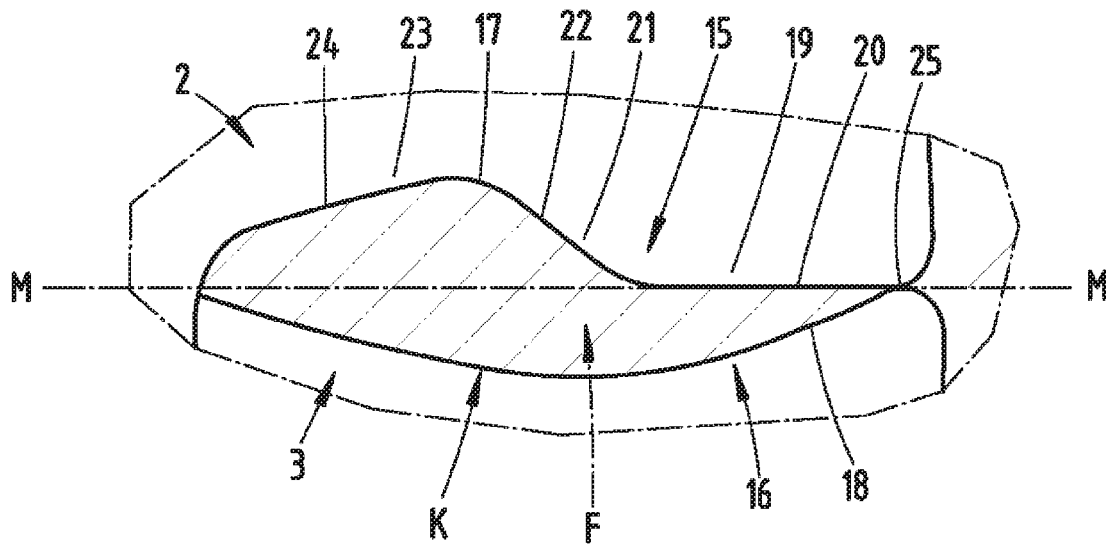
FIG. 9 shows an enlarged schematic representation of the cutting opening formed in a position according to FIG. 8.

Furthermore, the geometry of the shear blades 15 and 16 is chosen in such a way that, in a position of an initial contact between the first shear blade 15 and the second shear blade 16 in a contact point 25, the remaining and preferably all-around closed opening contour K between the first cutting edge 17 and the second cutting edge 18 is shaped asymmetrical with respect to the central plane M, which in this position preferably intersects the contact point 25. According to the illustration in FIG. 9, the opening area F, which is enclosed by the opening contour K and in FIG. 9 illustrated in the form of a dot-dashed hatching, is on one side of the central plane M bounded by the altogether concave cutting edge 18. The cutting edge 17 lying opposite of this cutting edge 18 is realized in such a way that its cutting edge section 20 of the first blade region 19 essentially extends in the central plane M or is oriented along this central plane whereas a widening of the opening area F beyond the central plane M is formed along the further extent of the cutting edge 17 due to the significantly sloped contour of the second cutting edge section 22 and the adjacent third cutting edge section 24.

Accordingly, the resulting opening area F extends approximately over the length f of the first blade region 19 and therefore over approximately one-fourth to one-third of the overall length l in the direction of the articulation region 4 starting from the contact point 25, wherein 80 percent or more of said opening area, e.g. up to approximately 100 percent, are only formed on one side of the central plane M, preferably facing the continuously concave cutting edge 18.

The illustration in FIG. 9, in particular, furthermore shows that this results in an approximately shoe-shaped opening area F in the instant of the contact between the shear blades 15, 16 in the contact point 25.

In the course of the further displacement of the plier limbs 2 and 3 into the closed position of the pliers and the associated reduction of the opening area F, this opening area assumes with nonconsideration of rounding geometries between the individual blade regions of the shear blade 16 a triangular shape, in which the cutting edge 18 of the second shear blade 16 intersects the cutting edge 17 of the first shear blade 15 in the region of the transition from the first blade region 19 to the second blade region 21 due to the overlap of the shear blades 15 and 16.

As a result of the above-described blade geometry, an object 26 to be cut with a large diameter, e.g. a cable, can also be severed without increased expenditure of force in an advantageous manner, particularly in terms of handling. Furthermore, elongate objects with an oval or rectangular cross section such as flat cables can also be advantageously severed. An object 26 to be cut in the form of such a flat cable is indicated in FIG. 7 with dot-dashed lines.

As a result of the proposed blade geometry, the object 26 to be cut is initially incised in the region lying remote from the articulation due to the interaction between the convex blade section in the first blade region 19 of the first shear blade 15 and the opposite concave cutting edge 18 of the second shear blade 16, wherein said object is subsequently severed starting from the region lying remote from the articulation toward the region lying near the articulation in the course of the further cutting process. In this case, the object 26 to be cut is at least by a tendency pushed into the cutting opening in the direction of the articulation region 4.

The proposed blade geometry furthermore makes it possible to reduce the cutting force by 20 to 50 percent in comparison with known solutions.

Due to the step formed in the central blade region 21, an inserted round cable can noticeably engage in order to thereby inform the user that the cable is correctly positioned in the blade. Furthermore, the step holds the round cable as close as possible to the articulation region such that the required cutting force is always minimized.

The cutting edges 17 and 18 preferably are laser-hardened.

The corresponding free ends of the plier limbs 2 and 3 in the flat jaw region 13 near the tip are realized with gripping surfaces 27 and 28 that face one another. In the closed state of the pliers 1, these gripping surfaces from a geometric interacting surface Z, which essentially coincides with the central plane M in the exemplary embodiment shown.

The gripping surfaces 27 and 28 are respectively provided with a structuring 29 in the form of a very fine diagonal toothing. This structuring ensures a sound retention without causing damages to a potential insulation or a wire or conductor.

The structuring may extend over the entire length of the respective gripping surface 27, 28 or over only part of its length.

Figure 6:
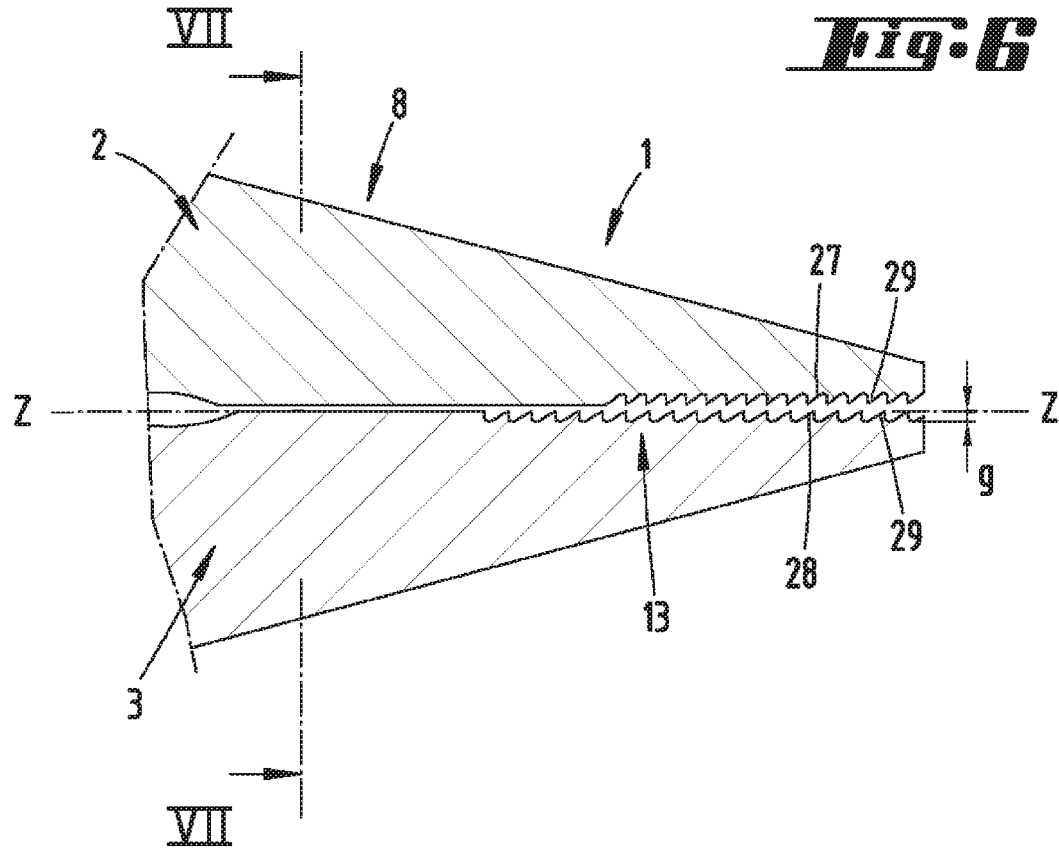
FIG. 6 shows an enlarged detail of the region VI in FIG. 5.

With respect to a cross section perpendicular to the central plane M, for example, according to the illustration in FIG. 6, the structuring 29 furthermore forms a sawtooth profiling that—referred to the valley of the structuring—has a structuring distance g from the interacting surface Z.

In a position for twisting wires, in which the wires are conventionally captured between the gripping surfaces 27 and 28 in the flat jaw region 13, the separating webs 14 in the region of the cutting patterns S for stripping wires or the like can be supported on the facing planar surface of the other plier limb and thereby prevent warping of the plier tip during a rotation of the pliers 1 as a whole about a longitudinal axis.

FIGS. 12 to 24 show an embodiment of the pliers, in which the flat jaw region 13 is with respect to the longitudinal direction of the plier limbs 2 and 3 divided into a fine-toothed gripping region 30 on the free ends of the plier limbs 2 and 3 and an adjacent coarse-toothed gripping region 31. The gripping regions 30 and 31 are spaced apart from one another in the longitudinal direction of the pliers 1 such that a gripping opening 32 is formed in between in the closed position of the pliers.

Figure 12:
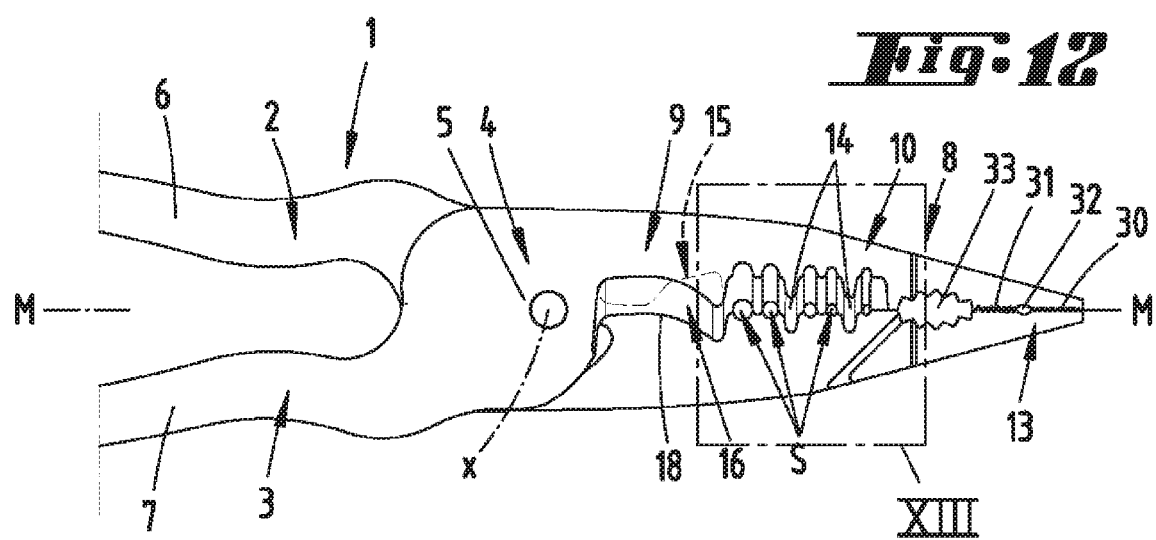
FIG. 12 shows a representation that corresponds to FIG. 3, but concerns a second embodiment.

Furthermore, a so-called burner hole 33 is formed between the flat jaw region 13 and the stripping region 10 in the closed position of the pliers according to FIG. 12.

The stripping region 10 essentially has the same design as in the first exemplary embodiment.

In this case, five cutting patterns S are provided over the length of the plier limbs 2 and 3, wherein two adjacent cutting patterns S respectively are essentially combined into a pair.

Starting from the cutting region 9, a pair of cutting patterns S is—viewed in the direction of the flat jaw region 13—initially provided directly adjacent to the cutting region 9 and separated from another adjacent pair of cutting patterns S by a separating web 14. An additional separating web 14 is provided between the altogether central pair of cutting patterns S and the fifth cutting pattern S, which in the exemplary embodiment shown is realized in the form of an individual cutting pattern, wherein this additional separating web may according to the illustrations be realized identical to the above-described separating web 14 between the pairs of cutting patterns S.

The flank of the first plier limb 2, which lies adjacent to the shear blade 15 of the cutting region 9, forms another separating web 14' on the side facing the stripping region 10.

Each cutting pattern S is formed by first and second blades 11, 12 that preferably are realized integrally with the respective first and second plier limbs 2, 3 and made of the same material.

In this case, each blade 11, 12 forms an essentially semicircular recess 34, wherein said recess and the recess 34 of the opposite blade 12, 11 complement one another so as to form a clear opening cross section 35, which in an outline essentially has the shape of a circular disk, in the closed position of the pliers.

An intermediate web 36 is formed between first or second blades 11, 12, which are arranged directly adjacent to one another in the longitudinal direction of the plier limbs 2, 3 and not separated by a separating web 14.

Consequently, each recess 34 is laterally bounded by either an intermediate web 36 or a respective separating web 14 or 14'.

Figure 14:
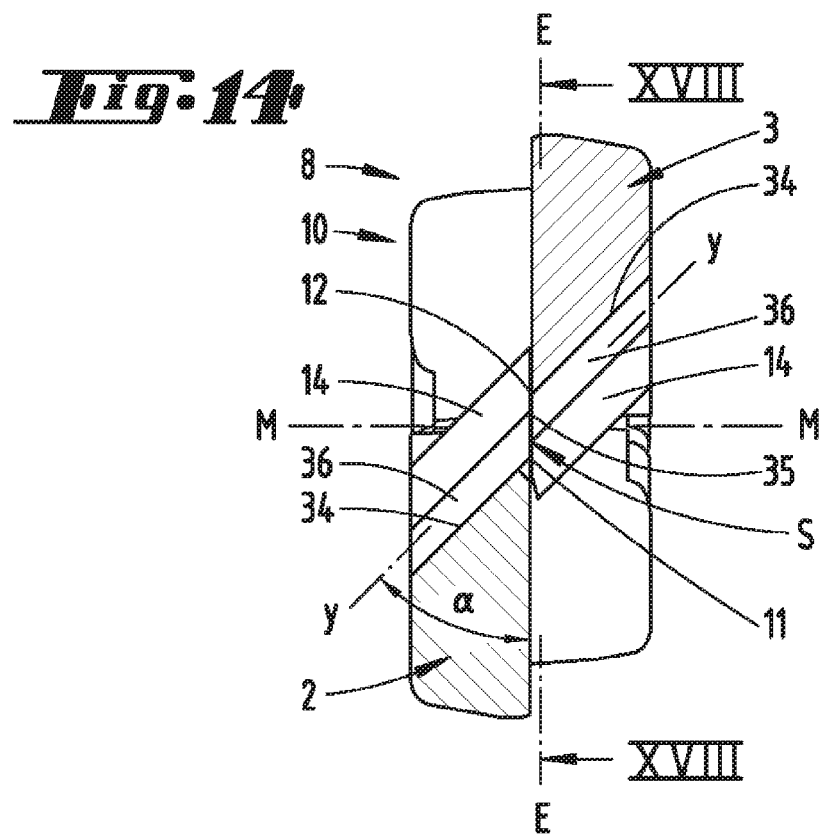
FIG. 14 shows a section along the line XIV-XIV in FIG. 13 through the region of a clear opening cross section remaining between first and second blades.
Figure 15:
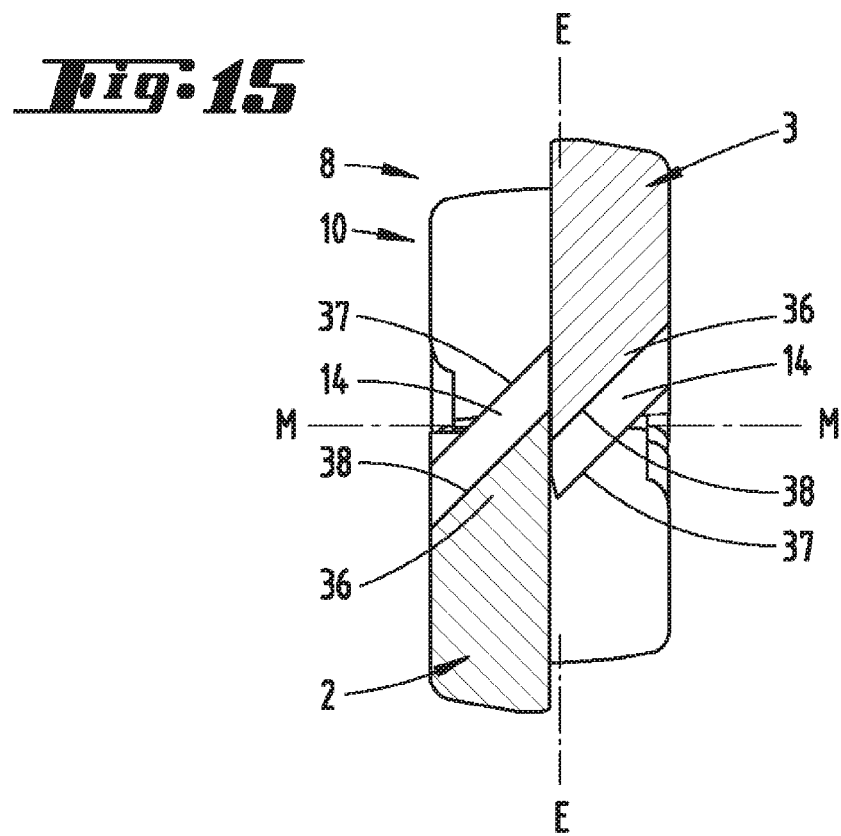
FIG. 15 shows a section along the line XV-XV in FIG. 13 through the region of an intermediate web.
Figure 20:
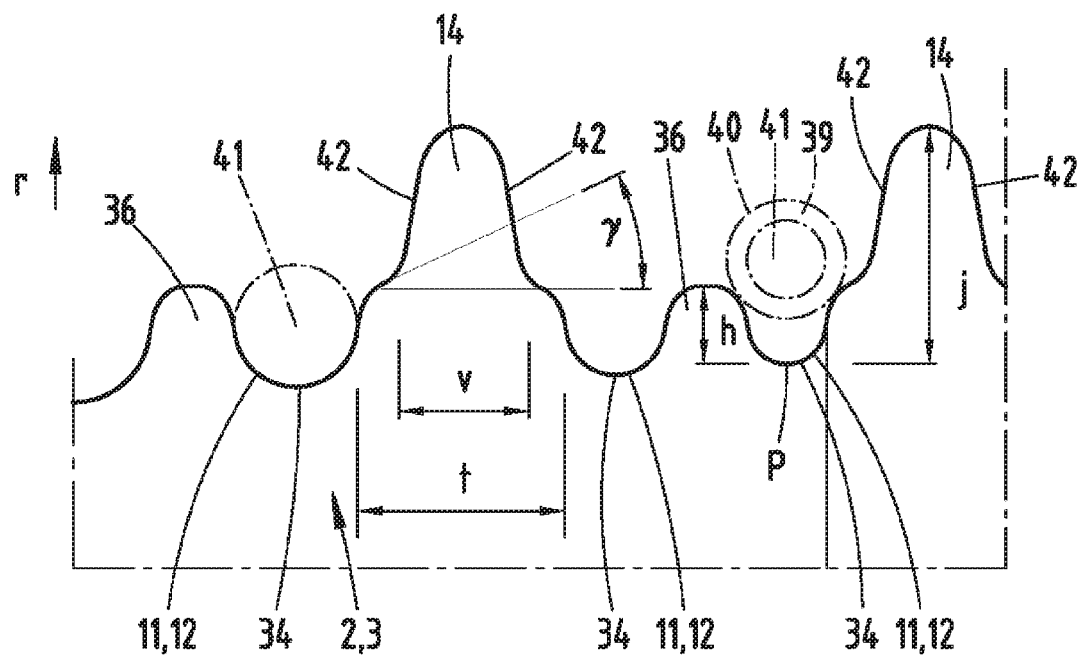
FIG. 20 shows a schematic representation of the stripping region of a plier limb with blades, intermediate webs and separating webs.
Figure 21:
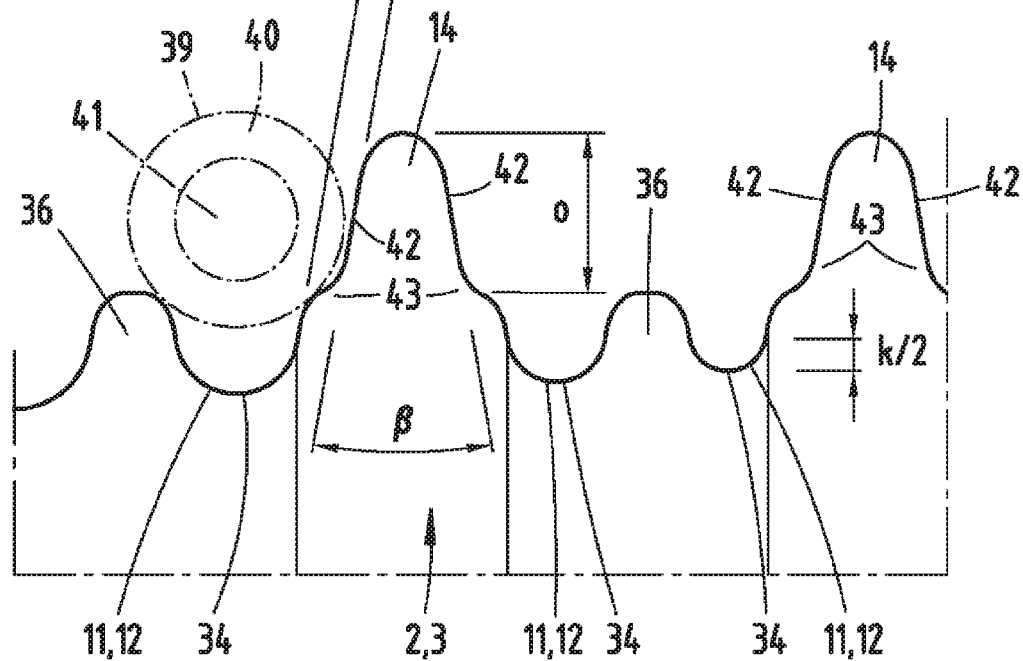
FIG. 21 shows a representation that corresponds to FIG. 20.
Figure 22:
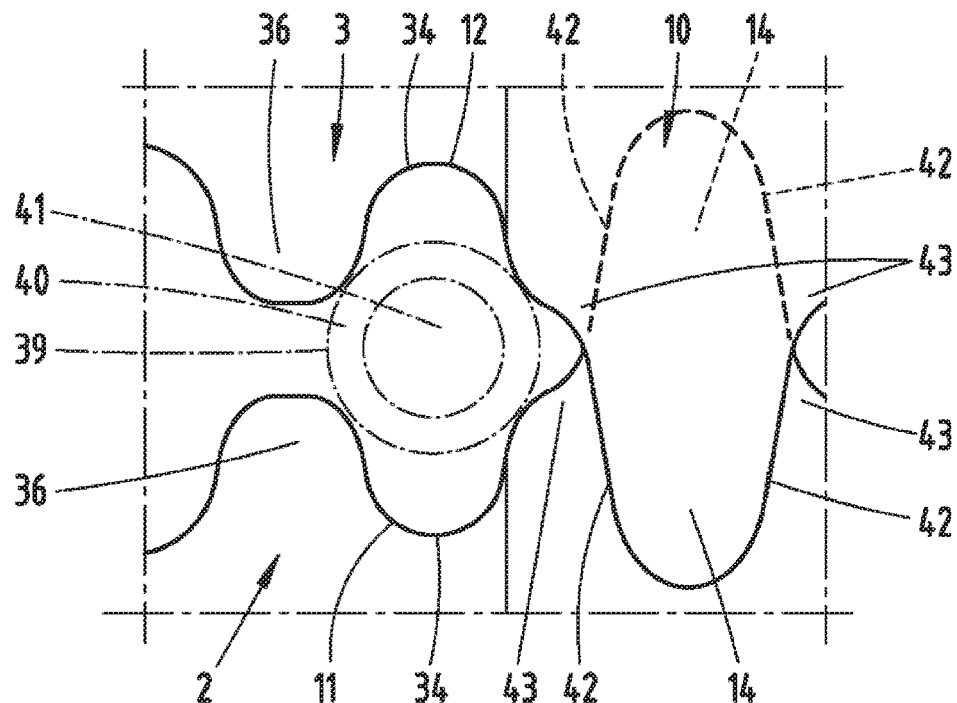
FIG. 22 schematically shows a detail of the stripping region concerning an intermediate position in the course of a closing motion of the pliers.
Figure 23:
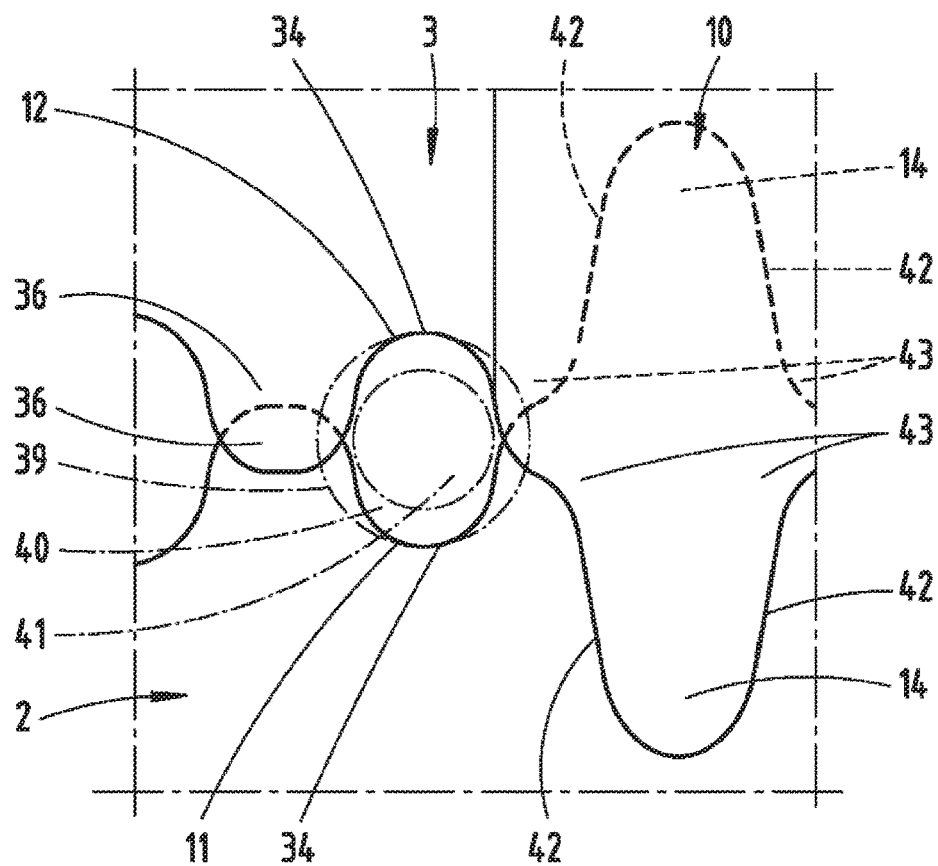
FIG. 23 shows a follow-up representation to FIG. 22 in the course of the further closing motion of the pliers.
Figure 24:
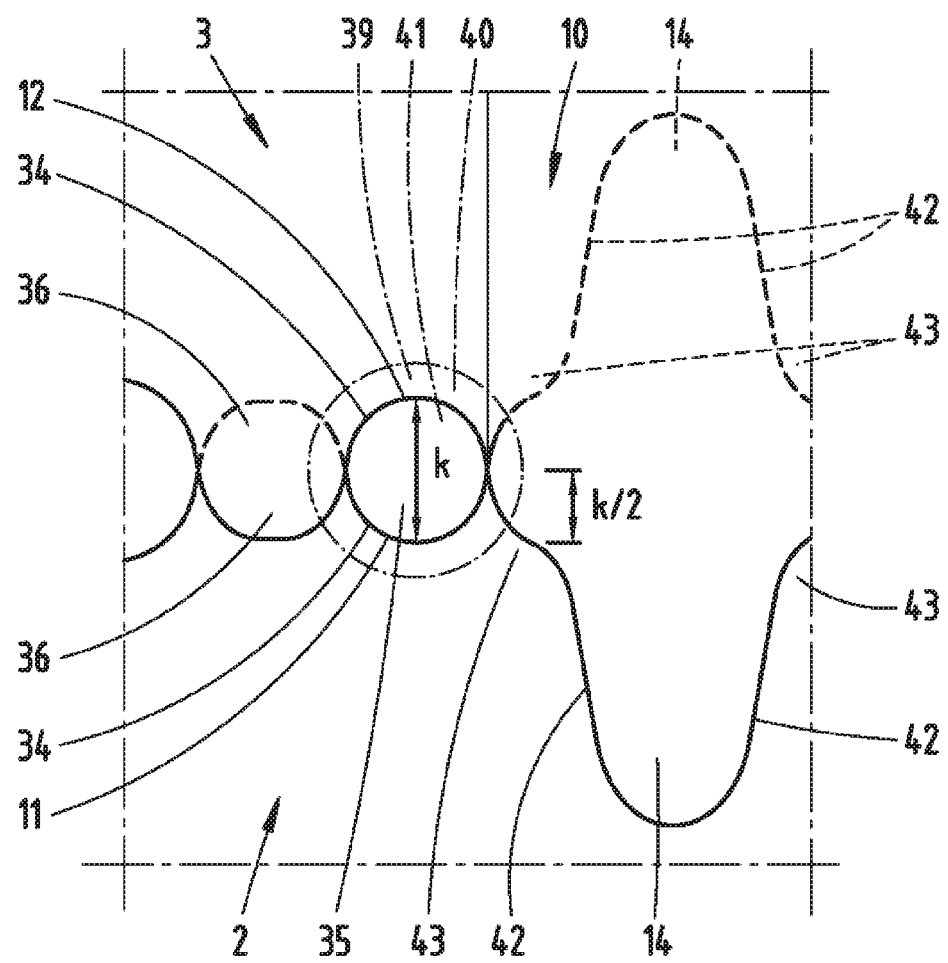
FIG. 24 shows a follow-up representation to FIG. 23 concerning the closed position of the pliers.

According to the sectional representation in FIG. 14, for example, a central axis y of the recess 34 extends at an acute angle $\alpha$ of approximately 45 degrees to the rotation and shear plane E. Furthermore, a free end face 37 of the separating webs 14 and preferably also such an end face 38 of the intermediate webs 36 include the same angle with the rotation and shear plane E.

The cutting patterns S are realized such that they form opening cross sections 35 of different sizes in the closed state of the first and second blades 11, 12. These opening cross sections accordingly can be associated with different conductor or cable diameters.

Each opening cross section 35 of each cutting pattern S being formed in the closed position of the pliers has a maximum opening dimension k, which in a preferably circular design corresponds to the diameter of the opening cross section 35. These opening dimensions k preferably are adapted to conventional conductor or wire diameters of cables 39 to be stripped. Such a cable 39 has an insulating sheath, which should be removed from the electrically conductive wire or conductor 41 by using the cutting patterns S.

Figure 13:
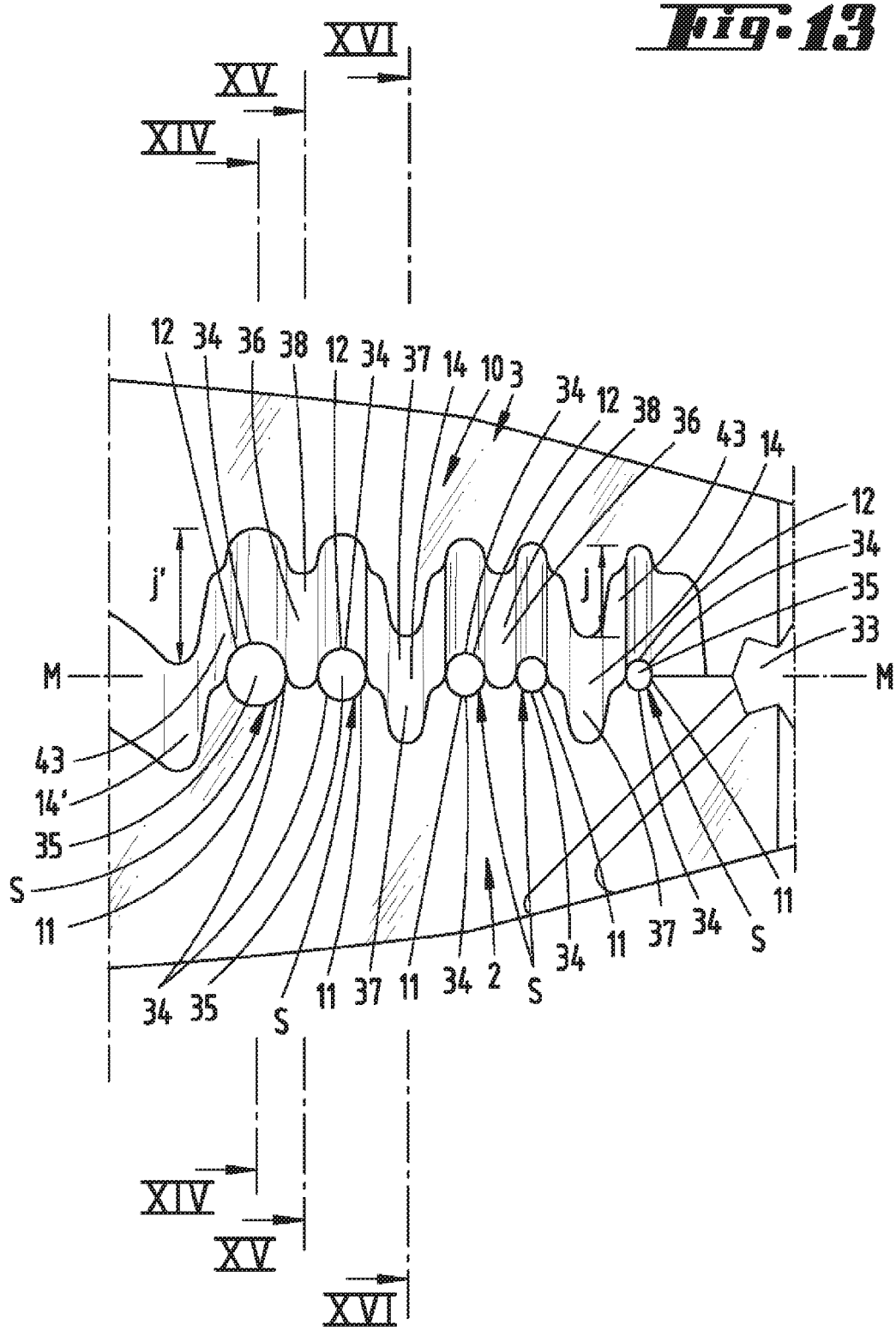
FIG. 13 shows an enlarged detail of the region XIII in FIG. 12.

With respect to an outline, e.g. according to FIG. 13, each separating web 14, particularly each separating web 14 that is respectively flanked by cutting patterns S or recesses 34 on both sides, extends starting directly from the respective recess edge. In this case, a length j of the separating webs 14 viewed in the closing direction r of the pliers 1 or perpendicular to the central plane M may approximately correspond to 3-times the opening dimension k measured from a lowest point P of the adjacent recess 34.

The additional separating web 14', which is only flanked by a recess 34 on one side, may have a comparatively greater length j'. For example, the length j' of the first separating web 14' may approximately correspond to 2-times the length j of the other separating webs 14 of the same plier limb.

In the exemplary embodiment shown, the length of the intermediate web 36 viewed in the same direction—and likewise measured from the lowest point P of the directly adjacent recess 34—approximately corresponds to 0.7-times to 0.95-times the opening dimension k of the opening cross section 35. Accordingly, the separating web 14 protrudes over the intermediate web 36 in the closing direction r.

With respect to an outline or a vertical projection of the separating web 14 into the rotation and shear plane E, a step-like design in the form of a taper 43 of the separating web 14 is formed on the outer edge 42 of the separating web 14, which faces the adjacent first or second blade 11, 12. The step-like taper 43 of the separating web 14 formed in the closed position of the pliers (compare, e.g., to FIG. 24) or the step-like widening of the opening cross section formed in an open position of the pliers starts at approximately half the opening dimension k/2 of the opening cross section 35. The resulting taper of the separating web 14—viewed transverse to the longitudinal extent of the separating web 14—, which in this case starts in the root region and runs into the recesses 34, has a width dimension t transverse to the longitudinal extent, which may approximately correspond to 1.5-times to 3-times, e.g. approximately 2-times, the reduced width dimension v behind the taper 43 (compare also to FIG. 20).

The flank angle $\beta$ included by the outer edges 42 may amount to between 0 and 90 degrees, preferably between 10 and 60 degrees, particularly to 20 degrees or 30 degrees. The insertion of the cable 39 may become more difficult at an angle smaller than zero. No contact surface, which can be sensed by the user and against which the user can place the cable 39 for positioning purposes, is formed if the angle $\beta$ exceeds 90 degrees.

The angle $\gamma$ of the resulting edge between the outer edge 42 of the separating web 14 and the outer edge of the recess 34 (compare to FIG. 20) preferably amounts to between 8 and 45 degrees, preferably between approximately 15 and 30 degrees, particularly to approximately 25 degrees. In this way, the cable 39 can be advantageously prevented from sliding off into the facing recess 34 during closing of the pliers 1. Furthermore, advantageous self-centering of the cable 39 can thereby be achieved.

Self-locking may occur in the worst-case scenario at an angle amounting, for example, to less than 8 degrees. A disadvantageously large distance between the separating web 14 or its outer edge 42 and the recess 34 would be formed if the angle $\gamma$ exceeds 45 degrees.

The distance m between the outer edge 42 of the separating web 14 and the associated flank of the recess 34 (compare to FIG. 21) preferably is greater than 0.5 mm, but smaller than half the opening dimension k. A distance m of more than 0.7 mm is advantageous because even cables 39 with a relatively thick insulating sheath 40 can center themselves in the respective recess 34 or cutting pattern S in this case. However, the distance m should be so small that cables 39 can automatically slide into the recess 34 during closing of the pliers 1.

The distance o between the highest point of the separating web 14 and the highest point of the intermediate web 36 preferably is greater than 1.5 mm, e.g. 1.8 or 2 mm. A sensible locating surface is thereby formed during positioning of the cable 39. If the distance is smaller than 1.5 mm, it can occur that the cable 39 slides off beyond the separating web 14 during its placement.

In a plier jaw position, in which an opening width q amounts to approximately 6 mm, a degree of overlap s of approximately 1 mm (compare to FIGS. 18 and 19) may be formed in the region of the separating webs 14 of both plier limbs 2 and 3 sliding on top of one another such that a mutual support can also be achieved in this non-closed plier jaw position, e.g. for twisting cables, in order to thereby torsionally stiffen the pliers 1.

According to the exemplary embodiment shown, a separating web 14 preferably is flanked on both sides by a respective recess 34 or cutting pattern S, which preferably serve solely for stripping individual conductors, as long as such a separating web is not formed on the end of the entire stripping region 10 (in this case the separating web 14').

Figure 27:
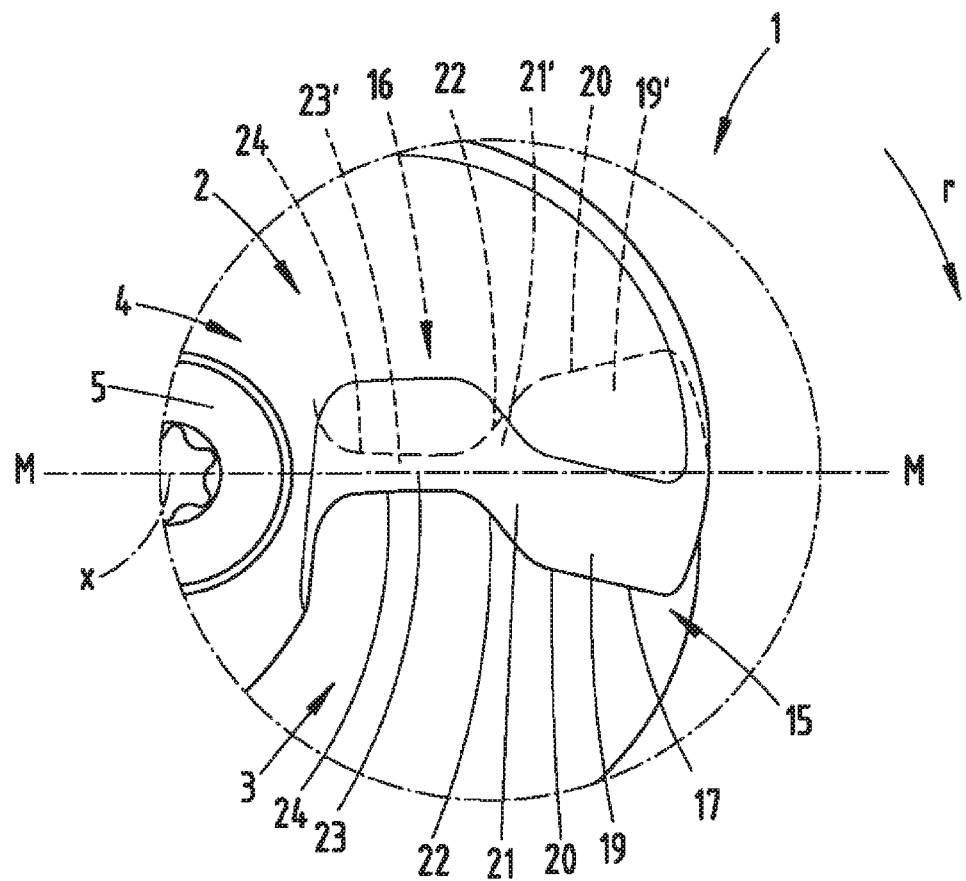
FIG. 27 shows a representation that corresponds to FIG. 10 and concerns the embodiment according to FIG. 25.

FIGS. 25 to 27 show an alternative design of a cutting region 9, wherein the first shear blade 15 is realized in accordance with the embodiment described with reference to FIGS. 1 to 12 and accordingly has three different blade regions 19, 21 and 23. The second shear blade 16 has a cutting edge 18, which with respect to the central plane M is shaped symmetrical to the cutting edge 17 of the first shear blade 15. Accordingly, a first blade region 19' with a first degree of slope corresponding to the blade region 19 of the first cutting edge 17, a second blade region 21' with a second degree of slope corresponding to the blade region 21' and a third blade region 23' are formed along the cutting edge 18.

The contact point 25 is formed in the region of the first blade regions 19 and 19' in this case.

The preceding explanations serve for elucidating all inventions that are included in this application and respectively enhance the prior art independently with at least the following combinations of characteristics, wherein two, multiple or all of these combinations of characteristics may also be combined with one another, namely:

Pliers, which are characterized in that the first shear blade 15 has a cutting edge 17 with different blade regions 19, 21 and 23, wherein a first blade region 19 formed in the region of the maximum degree of overlap u has referred to the overall length l of the cutting edge 17 a cutting edge section 20, which is sloped in the direction of the articulation region 4 with respect to the central plane M and with respect to the overall length l of the cutting edge 17 has a first degree of slope c', wherein a second blade region 21 has a second degree of slope c that is greater than the first degree of slope c', wherein a third blade region 23 has a third degree of slope that is smaller than the first and the second degree of slope c, c', and wherein the length d, e, f of each blade region 19, 21, 23 corresponds to one-fifth or more of the overall length l of the shear blade 15.

Pliers, which are characterized in that the opening contour K between the first and second cutting edges 17, 18 of the shear blades 15, 16, which remains in the position of an initial contact between the first shear blade 15 and the second shear blade 16 in a contact point 25 during closing of the plier limbs 2, 3, is realized symmetrical with respect to a central plane M extending transverse to the cutting plane E and through the axis of rotation x and the contact point 25.

Pliers, which are characterized in that the opening contour K between the first and second cutting edges 17, 18 of the shear blades 15, 16, which remains in the position of an initial contact between the first shear blade 15 and the second shear blade 16 in a contact point 25 during closing of the plier limbs 2, 3, is realized asymmetrical with respect to a central plane M extending transverse to the cutting plane E and through the axis of rotation x and the contact point 25.

Pliers, which are characterized in that the opening contour K is formed by a first convex extent of the first cutting edge 17 and an opposite concave extent of the second cutting edge 18.

Pliers, which are characterized in that the opening contour K is formed by an additional concave extent of the first cutting edge 17 opposite of the concave extent of the second cutting edge 18.

Pliers, which are characterized in that the concave extent of the first cutting edge 17 has a smaller degree of curvature than the concave extent of the second cutting edge 18.

Pliers, which are characterized in that two adjacently arranged first and second blades 11, 12 leave an intermediate web 36 between one another, wherein said intermediate web extends over less than a maximum opening dimension k of the opening cross section 35 in the closing direction r of the pliers 1 viewed from a lowest point P of the associated recess 34 in the closing direction r of the pliers 1, but such that the intermediate webs 36 of both plier limbs 2, 3 are in the closed position of the pliers 1 moved on top of one another in a region, in that a separating web, which extends over more than a maximum opening dimension k of the opening cross section 35 in the closing direction r of the pliers 1 viewed from a lowest point P of the associated recess 34 in the closing direction r of the pliers 1, protrudes over the respective recesses 34 on the other side of the intermediate web 36, and in that the blades 11, 12 and the associated plier limbs are made of the same material.

Pliers, which are characterized in that an outer edge 42 of the separating web 14, which faces the first or second blade 11, 12, is realized in a step-like manner in such a way that, in the closed state of the pliers 1, a step-like widening of the opening cross section 35 or a taper 43 of the separating web 14 transverse to the closing direction r of the pliers 1 is respectively formed starting at approximately half the opening dimension of the opening cross section 35.

Pliers, which are characterized in that the step-like taper 43 is formed approximately in the region of half the length (j) of the separating web 14.

Pliers, which are characterized in that adjacent blades 11, 12 form opening cross sections 35 of different sizes in the closed state of the pliers 1.

Pliers, which are characterized in that multiple separating webs 14, 14' are formed on a plier limb 2, 3 and two separating webs 14, 14' have different lengths j, j'.

Pliers, which are characterized in that the length j' of a first separating web 14' of a plier limb 2, 3 approximately corresponds to 2-times the length j of the second separating web 14 of the same plier limb 2, 3.

Pliers, which are characterized in that the intermediate webs and/or separating webs 36, 14 are formed on both plier limbs 2, 3.

All disclosed characteristics are essential to the invention (individually, but also in combination with one another). The disclosure of the associated/attached priority documents (copy of the priority application) is hereby fully incorporated into the disclosure content of this application, namely also for the purpose of integrating characteristics of these documents into claims of the present application. The characteristics of the dependent claims also characterize independent inventive enhancements of the prior art without the characteristics of a claim to which they refer, particularly for submitting divisional applications on the basis of these claims. The invention specified in each claim may additionally comprise one or more of the characteristics that were disclosed in the preceding description and, in particular, are identified by reference symbols and/or included in the list of reference symbols. The invention also concerns design variations, in which individual characteristics cited in the preceding description are not realized, particularly as far as they are obviously dispensable for the respective intended use or can be replaced with other, identically acting technical means.

LIST OF REFERENCE SYMBOLS

1 Pliers
2 First plier limb
3 Second plier limb
4 Articulation region
5 Articulation pin
6 Handle section
7 Handle section
8 Jaw region
9 Cutting region
10 Stripping region
11 First blade
12 Second blade
13 Flat jaw region
14 Separating web
14' Separating web 15 First shear blade
16 Second shear blade
17 First cutting edge
18 Second cutting edge
19 First blade region
19' First blade region
20 Cutting edge section
21 Second blade region
21' Second blade region
22 Cutting edge section
23 Third blade region
23' Third blade region
24 Cutting edge section
25 Contact point
26 Object to be cut
27 Gripping surface
28 Gripping surface
29 Structuring
30 Gripping region
31 Gripping region
32 Gripping opening
33 Burner hole
34 Recess
35 Opening cross section
36 Intermediate web
37 End face
38 End face
39 Cable
40 Insulating sheath
41 Conductor
42 Outer edge
43 Taper
E Rotation and shear plane
F Opening area
K Opening contour
M Central plane
P Point
S Cutting pattern
Z Interacting surface
a Distance
a' Distance
b Length
c Degree of slope
c' Degree of slope
d Partial length
e Partial length
f Partial length
g Structuring distance
h Length
j Length
j' Length
k Opening dimension
l Overall length
m Distance
Partial length
q Opening width
s Degree of overlap
t Width dimension
u Degree of overlap
u' Degree of overlap
v Width dimension
x Axis of rotation
α Angle
β Flank angle
γ Angle

The invention claimed is:

1. Pliers comprising a first plier limb and a second plier limb, which are held rotatably relative to one another in an articulation region with an axis of rotation,
wherein the plier limbs form a jaw region on one side of the articulation region and handle sections on the other side of the articulation region,
wherein the jaw region has a cutting pattern with first blades on the first plier limb and second blades on the second plier limb,
wherein the first and second blades interact for stripping cables and have semicircular recesses,
wherein the first and second blades with their recesses complement one another so as to form a clear opening cross section in a closed position of the pliers,
wherein two adjacently arranged blades of the first and second blades leave an intermediate web between one another,
wherein each of said intermediate webs extend over less than a maximum opening dimension of the opening cross section in a closing direction of the pliers viewed from a lowest point of the associated recess in the closing direction of the pliers but such that the intermediate webs of both plier limbs are, in the closed position of the pliers, moved on top of one another in a region,
wherein the first and second blades each have at least two separating webs, wherein each of said least two separating webs extend over more than a maximum opening dimension of the opening cross section in the closing direction of the pliers viewed from a lowest point of the associated recess in the closing direction of the pliers, and protrude over the respective recesses on opposite sides of the intermediate web, such that a single intermediate web is disposed between two said separating webs; and wherein the blades and the associated plier limbs are made of the same material.

2. The pliers according to claim 1, wherein an outer edge of the separating web, which faces the first or second blade, is realized in a step-like manner in such a way that, in the closed state of the pliers, a step-like widening of the opening cross section or a taper of the separating web transverse to the closing direction of the pliers is respectively formed starting at approximately half the opening dimension of the opening cross section and/or wherein a step-like taper is formed approximately in the region of half the length of the separating web.

3. The pliers according to claim 1, wherein adjacent blades form opening cross sections of different sizes in the closed state of the pliers.

4. The pliers according to claim 1, wherein multiple separating webs are formed on one of the plier limbs and two separating webs have different lengths and/or wherein a length of a first separating web of one of the plier limbs corresponds to approximately two times a length of a second separating web of the same plier limb and/or wherein the intermediate webs and/or separating webs are formed on both plier limbs.

5. The pliers according to claim 1, further comprising first and second shear blades which, in the closed position of the pliers, are moved on top of one another in a scissor-like manner with respect to a shear plane (E) and an axis of rotation that extends in the closed state through a central plane (M) perpendicular to the shear plane (E), wherein the shear blades are moved on top of one another to a greater degree (u) in the opening direction of the pliers in a region lying remote from the articulation region than in a region lying closer to the articulation region, and wherein the first shear blade has a cutting edge with different blade regions, wherein a first blade region of the different blade regions, formed in a region of the maximum degree of overlap (u), has a cutting edge section relative to an overall length (I) of the cutting edge, the cutting edge section being sloped in a direction of the articulation region with respect to the central plane (M) and with respect to the overall length (I) of the cutting edge has a first degree of slope, wherein a second blade region of the different blade regions has a second degree of slope (c) that is greater than the first degree of slope (c'), wherein a third blade region of the different blade regions has a third degree of slope that is smaller than the first and the second degree of slope (c, c'), and wherein a length (d, e, f) of each blade region of the different blade regions corresponds to one-fifth or more of the overall length (I) of the cutting edge.

6. The pliers according to claim 5, wherein an opening contour (K) between the first and second cutting edges of the shear blades, which remains in a position of an initial contact between the first shear blade and the second shear blade in a contact point during closing of the plier limbs, is symmetrical with respect to the central plane (M) extending transverse to the cutting plane (E) and through the axis of rotation (x) and a contact point.

7. The pliers according to claim 6, wherein the opening contour (K) is formed by a first convex extent of the first cutting edge and an opposite concave extent of the second cutting edge.

8. The pliers according to claim 7, wherein the concave extent of the first cutting edge has a smaller degree of curvature than the concave extent of the second cutting edge.

9. The pliers according to claim 6, wherein the opening contour (K) is formed by an additional concave extent of the first cutting edge opposite of the concave extent of the second cutting edge.

10. The pliers according to claim 5, wherein an opening contour (K) between the first and second cutting edges of the shear blades, which remains in a position of an initial contact between the first shear blade and the second shear blade in a contact point during closing of the plier limbs, is asymmetrical with respect to a central plane (M) extending transverse to the cutting plane (E) and through the axis of rotation (x) and a contact point.

11. Pliers comprising a first plier limb and a second plier limb, which are held rotatably relative to one another in an articulation region with an axis of rotation,
    wherein the plier limbs form a jaw region on one side of the articulation region and handle sections on the other side of the articulation region,
    wherein the jaw region has a cutting pattern with first blades on the first plier limb and second blades on the second plier limb,
    wherein the first and second blades interact for stripping cables and have semicircular recesses,
    wherein the first and second blades with their recesses complement one another so as to form a clear opening cross section in a closed position of the pliers,
    wherein two adjacently arranged blades of the first and second blades leave an intermediate web between one another,
    wherein each of said intermediate webs extend over less than a maximum opening dimension of the opening cross section in a closing direction of the pliers viewed from a lowest point of the associated recess in the closing direction of the pliers but such that the intermediate webs of both plier limbs are, in the closed position of the pliers, moved on top of one another in a region,
    wherein a separating web, which extends over more than a maximum opening dimension of the opening cross section in the closing direction of the pliers viewed from a lowest point of the associated recess in the closing direction of the pliers, protrudes over the respective recesses on an opposite side of the intermediate web,
    wherein the separating web has a linear outer edge that is arranged above and offset from a linear flank of the associated recess by a constant distance, and
    wherein the blades and the associated plier limbs are made of the same material.

* * * * *